United States Patent
Onimatsu

(10) Patent No.: US 10,449,741 B2
(45) Date of Patent: Oct. 22, 2019

(54) RIGID CORE MOLD REMOVAL DEVICE AND TIRE MANUFACTURING METHOD

(71) Applicant: SUMITOMO RUBBER INDUSTRIES, LTD., Kobe-shi, Hyogo (JP)

(72) Inventor: Hiroyuki Onimatsu, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 690 days.

(21) Appl. No.: 14/427,574

(22) PCT Filed: Sep. 17, 2013

(86) PCT No.: PCT/JP2013/075040
§ 371 (c)(1),
(2) Date: Mar. 11, 2015

(87) PCT Pub. No.: WO2014/054415
PCT Pub. Date: Apr. 10, 2014

(65) Prior Publication Data
US 2015/0246491 A1    Sep. 3, 2015

(30) Foreign Application Priority Data
Oct. 2, 2012    (JP) .................... 2012-220607

(51) Int. Cl.
*B29D 30/06*    (2006.01)
*B29D 30/12*    (2006.01)
(Continued)

(52) U.S. Cl.
CPC ........ *B29D 30/0649* (2013.01); *B29C 33/485* (2013.01); *B29C 33/76* (2013.01);
(Continued)

(58) Field of Classification Search
CPC .... B29D 30/0649; B29C 33/485; B29C 33/76
See application file for complete search history.

(56) References Cited

U.S. PATENT DOCUMENTS

| 4,106,888 A | 8/1978 | Calori |
| 6,113,833 A * | 9/2000 | Ogawa ................ B29D 30/12 |
| | | 156/110.1 |

(Continued)

FOREIGN PATENT DOCUMENTS

| EP | 1 652 659 A1 | 5/2006 |
| EP | 1 792 712 A1 | 6/2007 |

(Continued)

OTHER PUBLICATIONS

Extended European Search Report, dated Jun. 17, 2016, for European Application No. 13843316.4.

(Continued)

*Primary Examiner* — Jacob T Minskey
*Assistant Examiner* — Melody Tsui
(74) *Attorney, Agent, or Firm* — Birch, Stewart, Kolasch & Birch, LLP

(57) ABSTRACT

A method for manufacturing a tire T comprises a step for forming a green tire on the outside of a rigid core mold 2, a step for vulcanization-molding and obtaining a tire-accompanying rigid core mold G, a step for setting, at an assembly station P3, a core 5 taken out from the tire-accompanied rigid core mold G, and a removal and assembly step for removing one core segment 3 from the tire T by moving in inwardly in the tire radial direction from the tire-accompanying rigid core mold G and mounting it on the core 5 set at the assembly station. The removal and assembly step is performed for every core segment in the tire, whereby a rigid core mold 2 is assembled at the assembly station P3, while removing the rigid core mold 2 from the tire T.

10 Claims, 17 Drawing Sheets

(51) Int. Cl.
*B29D 30/10* (2006.01)
*B29C 33/76* (2006.01)
*B29C 33/48* (2006.01)
*B29L 30/00* (2006.01)

(52) U.S. Cl.
CPC ..... *B29D 30/0645* (2013.01); *B29D 30/0661* (2013.01); *B29D 30/0662* (2013.01); *B29D 30/10* (2013.01); *B29D 30/12* (2013.01); *B29D 2030/0646* (2013.01); *B29L 2030/00* (2013.01)

(56) References Cited

U.S. PATENT DOCUMENTS

| | | | |
|---|---|---|---|
| 2004/0234637 A1* | 11/2004 | Ito | B29D 30/005 425/34.1 |
| 2006/0096690 A1 | 5/2006 | Nakata | |
| 2007/0029028 A1 | 2/2007 | Cordaillat et al. | |

FOREIGN PATENT DOCUMENTS

| | | |
|---|---|---|
| EP | 2 072 228 A1 | 6/2009 |
| FR | 2 314 050 A1 | 1/1977 |
| JP | 11-58385 A | 3/1999 |
| JP | 11-058385 A | 3/1999 |
| JP | 2001-150447 A | 6/2001 |
| JP | 2006-160236 A | 6/2006 |
| JP | 2007-253415 A | 10/2007 |

OTHER PUBLICATIONS

International Search Report issued in PCT/JP2013/075040 dated Nov. 26, 2013.

* cited by examiner (A)

(B)

RIGID CORE MOLD REMOVAL DEVICE AND TIRE MANUFACTURING METHOD

TECHNICAL FIELD

The present invention relates to a tire manufacturing method and a rigid core mold removal device capable of assembling a rigid core mold, which is repeatedly used in tire manufacturing, at another position while removing it from a tire inner cavity.

BACKGROUND ART

Recent years, in order to obtain higher molding accuracy, a tire is manufactured, as shown in FIG. 16 (A), by forming an unvulcanized green tire t1 on the outside of a rigid core mold (a) having rigidity, and
vulcanization-molding the green tire t1 together with the rigid core mold (a). (for example the following patent document 1) The green tire t1 is formed by sequentially applying tire construction members, e.g. inner liner, carcass ply, belt ply, sidewall rubber, tread rubber and the like.

As shown in FIG. 16 (B), the rigid core mold (a) includes a core main portion a1 formed in a circular ring by arranging a plurality of core segments c in the circumferential direction, and a cylindrical core d to which each core segment c is fixed with bolts e.

In the case of such rigid core mold (a), each core segment c can be removed from the inner cavity of the tire after vulcanization.
For example, through an opening of the core d, all of the bolts e are removed.
Then, the core d is taken out from the rigid core mold (a). Then, each core segment c is taken out one by one in order through the inner cavity of the tire.
The took-out core segments c are each mounted on the core d and fixed by the bolts e, thereby, a rigid core mold (a) is newly assembled.

PRIOR ART DOCUMENT

Patent Document

Patent document 1: JP-A-2006-160236

SUMMARY OF INVENTION

Problems to be Solved by the Invention

However, as the rigid core mold (a) is heavy and each core segment c is fixed to the core d by the bolts e, the work for taking out each core segment c through the inner cavity of the tire after vulcanization, and the work for newly assembling a rigid core mold (a) by mounting each core segment c on the core d impose a heavy burden on a worker.

The present invention was made with the view to the above-mentioned actual circumstances, and an object is to provide a tire manufacturing method and a rigid core mold removal device capable of newly assembling a rigid core mold at another position while removing the rigid core mold from the tire after vulcanization, and thereby it is possible to greatly alleviate the burden on the worker.

Means of Solving the Problems

A first invention of the present invention is a method for manufacturing a tire comprising a step for forming a green tire on an outside of an assembling type rigid core mold,
the rigid core mold comprising
a core main portion formed in a circular ring having a central hole including the tire revolution axis, by arranging a plurality of core segments in the tire circumferential direction, and
a cylindrical core being able to fit in the central hole and able to be removed from the central hole by its axial movement, wherein
by being fitted, the core allows each core segment to be fixed in the tire radial direction and the tire circumferential direction, and
by being removed, the core allows the core segments to move inwardly in the tire radial direction,
a step for obtaining a tire-accompanied rigid core mold by vulcanization-molding the green tire together with the rigid core mold,
a step for
removing the core from the tire-accompanied rigid core mold and setting the core at an assembly station, and
a core segment removal and assembly step for removing one of the core segments from the tire by moving it inwardly in the tire radial direction from the tire-accompanied rigid core mold from which the core is removed, and
mounting it on the core set at the assembly station, wherein
the removal and assembly step is performed for every core segment in the tire, whereby the rigid core mold is assembled at the assembly station while removing the rigid core mold from the tire.

In the first invention, it is preferable that the removal and assembly step includes
a step for pressing a tread portion of the tire of the tire-accompanied rigid core mold from the outside in the tire radial direction, and holding it,
a removing step in which by pushing a tread portion positioned on the outside in the tire radial direction of the core segment to be removed, inwardly in the tire radial direction from the outside in the tire radial direction, the core segment is removed.

In the first invention, it is preferable that the removing step includes a step for
rotating the held tire-accompanied rigid core mold around the tire revolution axis, and
removing the core segment from a predetermined same position.

In the first invention, it is preferable that the removal and assembly step includes an assembly step for rotating the core set at the assembly station around the tire rotation axis, and mounting the core segment on the core at a predetermined same position.

In the first invention, it is preferable that
an outer circumferential surface in the tire radial direction, of the core is provided with a first engaging portion which is one of a dovetail groove and a dovetail tenon which extends in the tire axial direction, with the same cross-sectional shape,
an inner circumferential surface in the tire radial direction, of each core segment is provided with a second engaging portion which is the other of the dovetail groove and the dovetail tenon which engages with the first engaging portion of the core, and
the held tire-accompanied rigid core mold and the core set at the assembly station each lie in a horizontally oriented state in which the tire revolution axis is vertical.

In the first invention, it is preferable to include a conveying step for carrying back the rigid core mold assembled at the assembly station to the step for forming the green tire so as to successively manufacture the tire.

A second invention of the present invention is an apparatus for removing a rigid core mold from a tire-accompanied rigid core mold made up of the rigid core mold and a vulcanized tire formed on the outside thereof, and characterized in that the rigid core mold includes
a core main portion formed in a circular ring having a central hole including the tire revolution axis by arranging a plurality of core segments in the tire circumferential direction, and a cylindrical core being able to fit in the central hole or able to be removed from the central hole by its axial movement, and it is an assembling type in which
by being fitted, the core allows each core segment to be fixed in the tire radial direction and the tire circumferential direction, and by being removed, the core allows the core segments to move inwardly in the tire radial direction, and the apparatus has
a core holding unit for taking out the core from the tire-accompanied rigid core mold, and holding it, a tire holding unit for pressing a tread portion of the tire of the tire-accompanied rigid core mold from which the core has been taken out, from the outside in the tire radial direction, and holding it, a segment removing unit
being able to enter the central hole of the tire-accompanied rigid core mold held by the tire holding unit
for coupling with one core segment through the central hole, pulling it inwardly in the tire radial direction from the tire, and
removing it from the tire, and a segment assembling unit for
receiving the core segment from the segment removing unit and mounting the core segment on the core held by the core holding unit.

In the second invention, it is preferable that
an outer circumferential surface in the tire radial direction, of the core is provided with a first engaging portion which is one of a dovetail groove and a dovetail tenon which extends in the tire axial direction, with the same cross-sectional shape, an inner circumferential surface of each core segment is provided with a second engaging portion which is the other of the dovetail groove and the dovetail tenon which engages with the first engaging portion of the core, and the core held by the core holding unit lies in a horizontally oriented state in which the tire revolution axis is vertical.

In the second invention, it is preferable that
the tire holding unit holds movably up and down the tire-accompanied rigid core mold from which the core has been taken out.

In the second invention, it is preferable that
the tire holding unit includes tread pushers for pressing a tread portion of the tire-accompanied rigid core mold lying in a horizontally oriented state in which the tire revolution axis is vertical, the tread pushers are arranged in the circumferential direction of the tire-accompanied rigid core mold, each tread pusher has
an actuator having an rod extensible in the tire radial direction, and
a pad fixed to the rod of the actuator to contact with the tread portion of the tire-accompanied rigid core mold.

In the second invention, it is preferable that by making the amount of extension of the rod of the tread pusher positioned on the outside in the tire radial direction, of the core segment to be removed by the segment removing unit being more than the amount of extension of the rods of the other tread pushers, the tire holding unit pushes out inwardly in the tire radial direction the core segment to be removed.

In the second invention, it is preferable that the tire holding unit has an annular frame part having an inside diameter more than the outside diameter of the tire-accompanied rigid core mold and being rotatable around the tire revolution axis, and the tread pushers are disposed in the annular frame part, and rotate the tire-accompanied rigid core mold together with the annular frame part so as remove the core segments from a predetermined same position.

In the second invention, it is preferable that
the segment removing unit has
an immovable frame part fixed to a floor,
a movable part being movable relatively to the frame part,
a chuck part provided on the movable part and being engageable with an inner circumferential surface in the tire radial direction, of the core segment, and the movable part is movable in the tire axial direction and in the tire radial direction of the tire-accompanied rigid core mold held by the tire holding unit.

In the second invention, it is preferable that
the inner circumferential surface of the core segment is provided with a hole denting outwardly in the tire radial direction, and the chuck part is able to insert in the hole and has a coupling device being able to fix to and release from the hole.

In the second invention, it is preferable that
the segment assembling unit has
an immovable frame part fixed to a floor,
a movable part being movable relatively to the frame part,
a clamp part provided on the movable part for clamping the core segment from both sides in the tire axial direction, and the movable part is movable in the tire axial direction and in the tire radial direction of the segment held by the segment removing unit.

In the second invention, it is preferable that
side faces on both sides, of the core segment facing outside in the tire axial direction are provided with inserting holes into which the clamp part can be inserted.

Effects of the Invention

According to the tire manufacturing method of the present invention, there are included
the step for taking out the core from the tire-accompanied assembling type rigid core mold and for setting it at the assembly station, and the removal and assembly step in which, by moving one core segment inwardly in the tire radial direction from the tire-accompanied rigid core mold from which the core has been taken out, the core segment is removed from the tire and mounted on the core.

The removal and assembly step is performed for every core segment in the tire.

Accordingly, it is possible to assemble a new rigid core mold at the assembly station, while removing the rigid core mold from the tire.

Therefore, the burden on the worker is greatly alleviated.

According to the rigid core mold removal device of the present invention, it has
the core holding unit for taking out the core from the tire-accompanied assembling type rigid core mold and for holding it,
the tire holding unit for holding the tire-accompanied rigid core mold from which the core has been taken out,
the segment removing unit for removing the core segments from the tire held by the tire holding unit, and
the segment assembling unit for receiving the core segments from the segment removing unit and for mounting the core segments on the core.
Accordingly, it is possible to assemble a new rigid core mold at the assembly station, while removing the rigid core mold from the tire.
Therefore, the burden on the worker is greatly alleviated.

MODE FOR CARRYING OUT THE INVENTION

Figure 1:
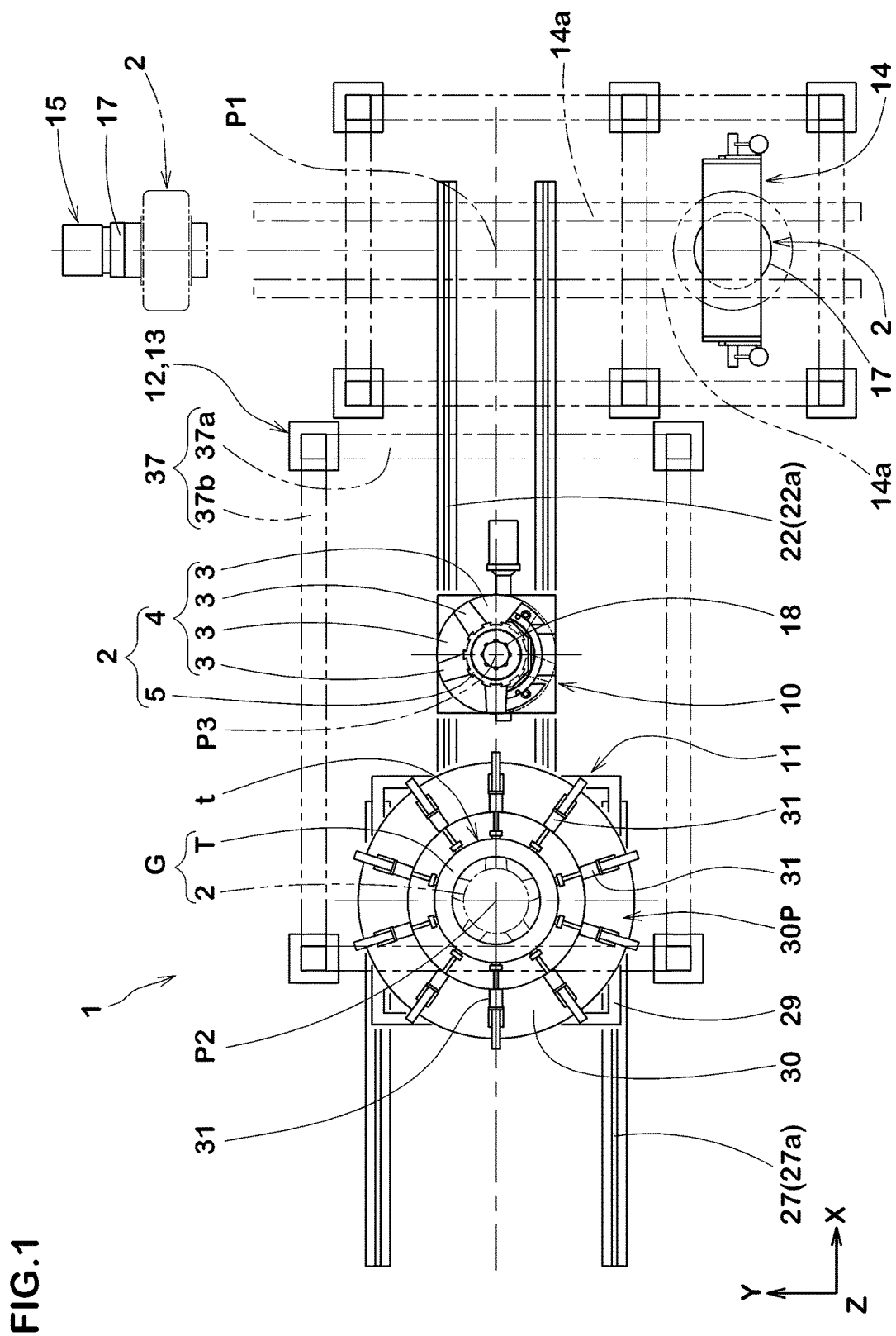
FIG. 1 A plan view of a rigid core mold removal device in which an embodiment of the present invention is shown.
Figure 2:
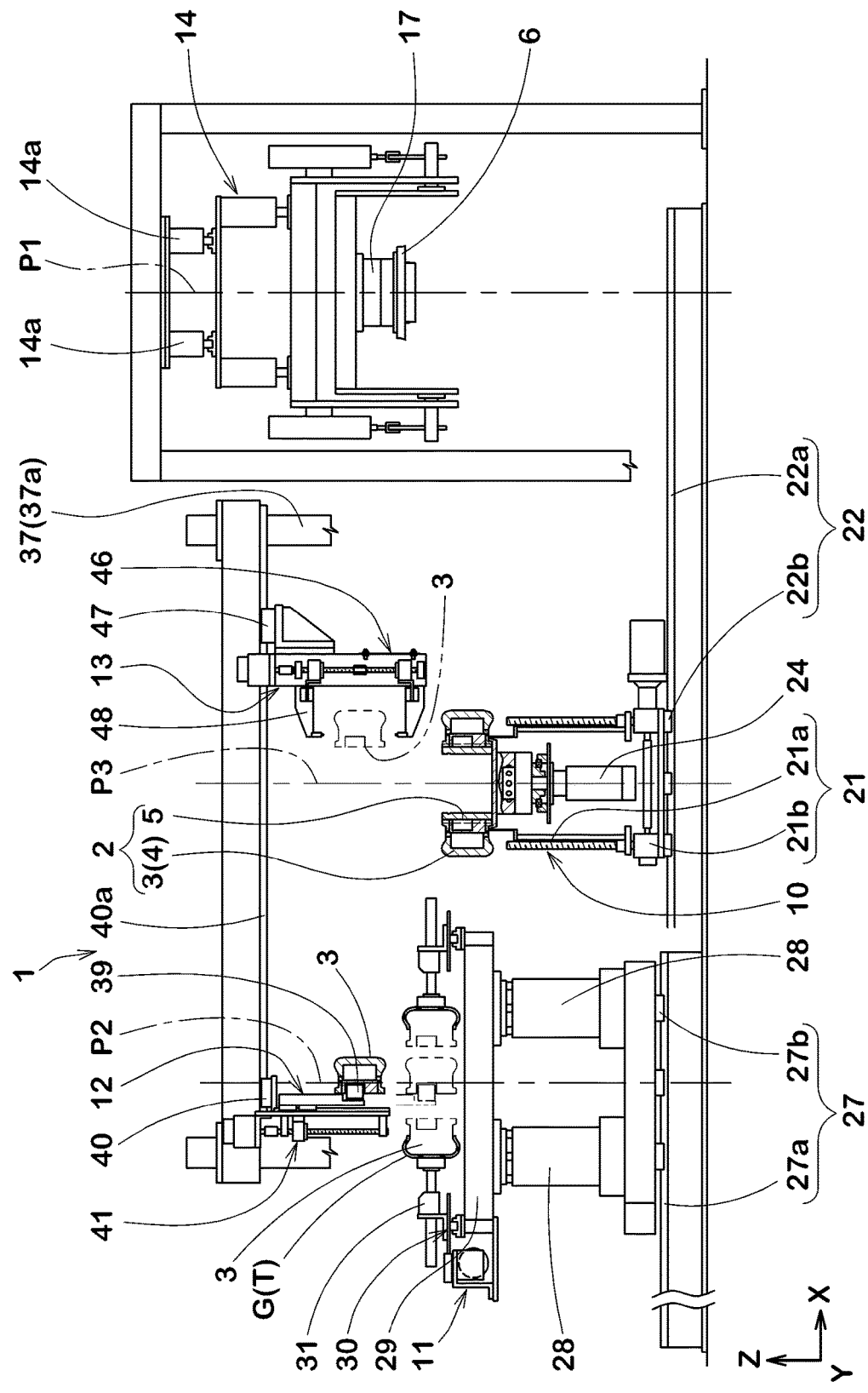
FIG. 2 A side view of the removal device in FIG. 1.
Figure 3:
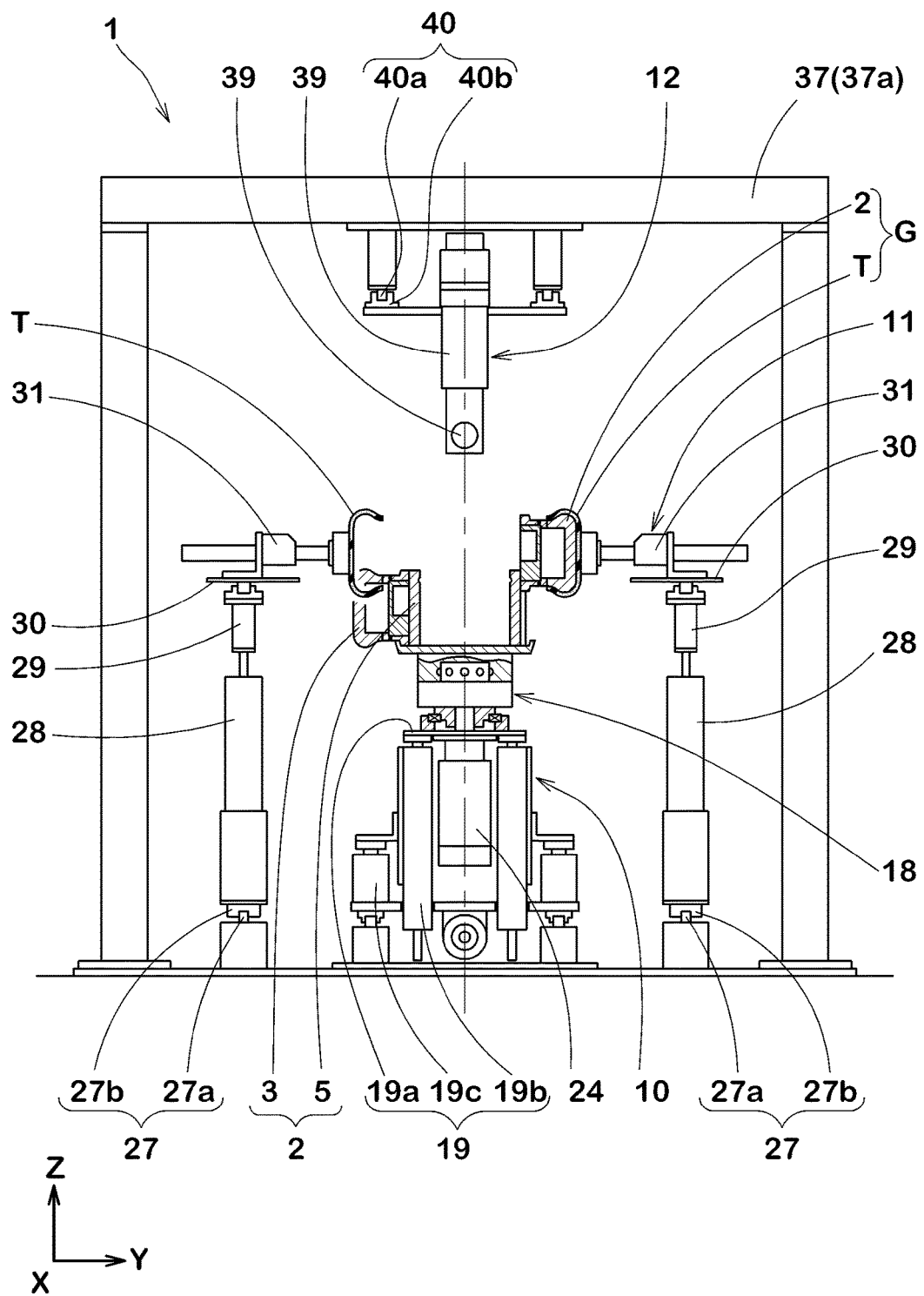
FIG. 3 A front view of the removal device in FIG. 1.

An embodiment of the present invention will be described in conjunction with the accompanying drawings.
In FIG. 1, shown is a plan view in which a part of an apparatus 1 for removing a rigid core mold 2 in this embodiment is magnified.
In FIG. 2, a side view of the removing apparatus 1 in FIG. 1 is shown.
In FIG. 3, a front view of the removing apparatus 1 is shown.
As shown in FIG. 1-FIG. 3, the removing apparatus 1 can remove the rigid core mold 2 from a tire T of a tire-accompanied rigid core mold G.
The tire-accompanied rigid core mold G includes the rigid core mold 2 and the vulcanized tire T formed on the outside of the rigid core mold 2.

Figure 4A:
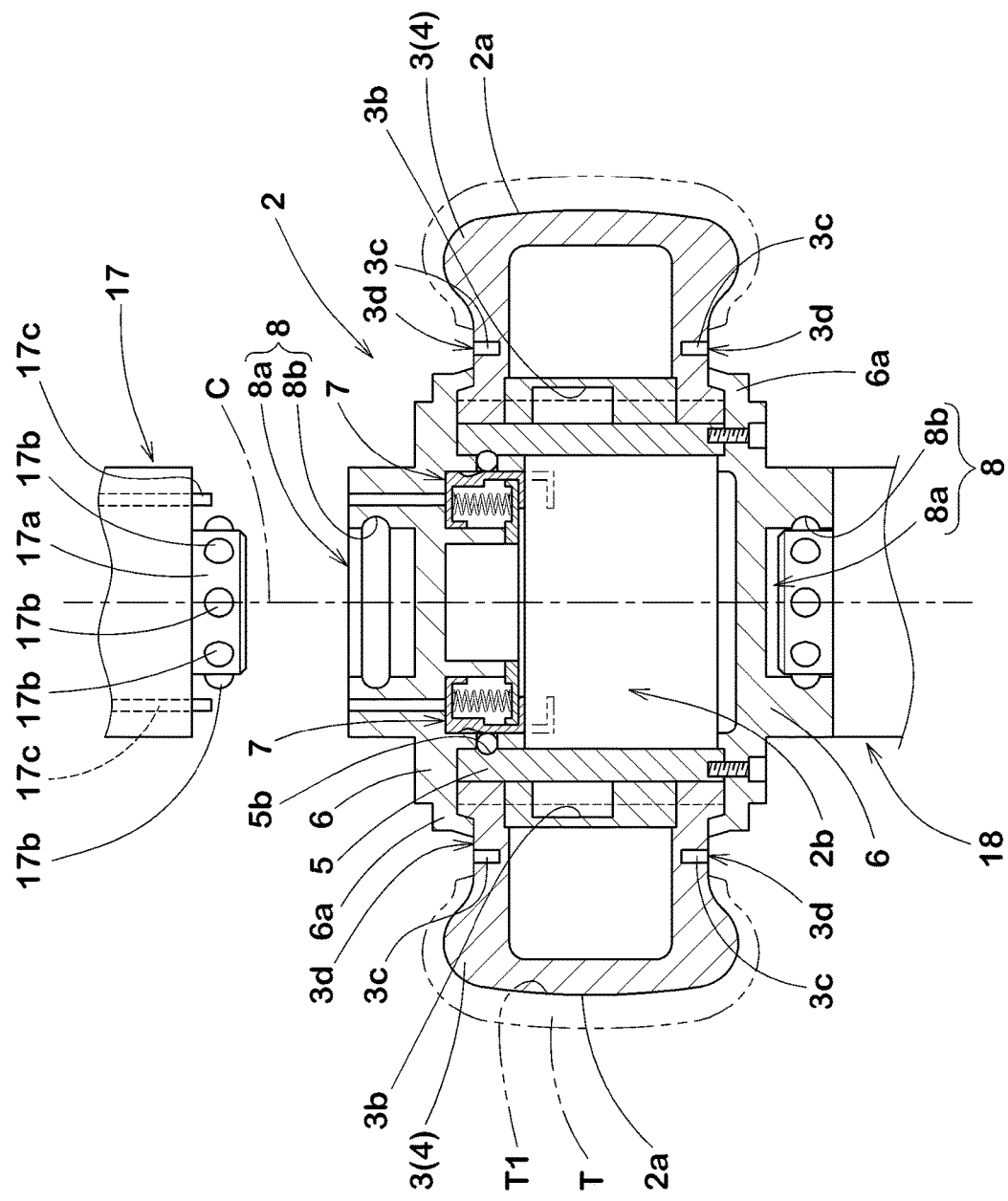
FIG. 4(A) A cross sectional view of a rigid core mold.
Figure 4B:
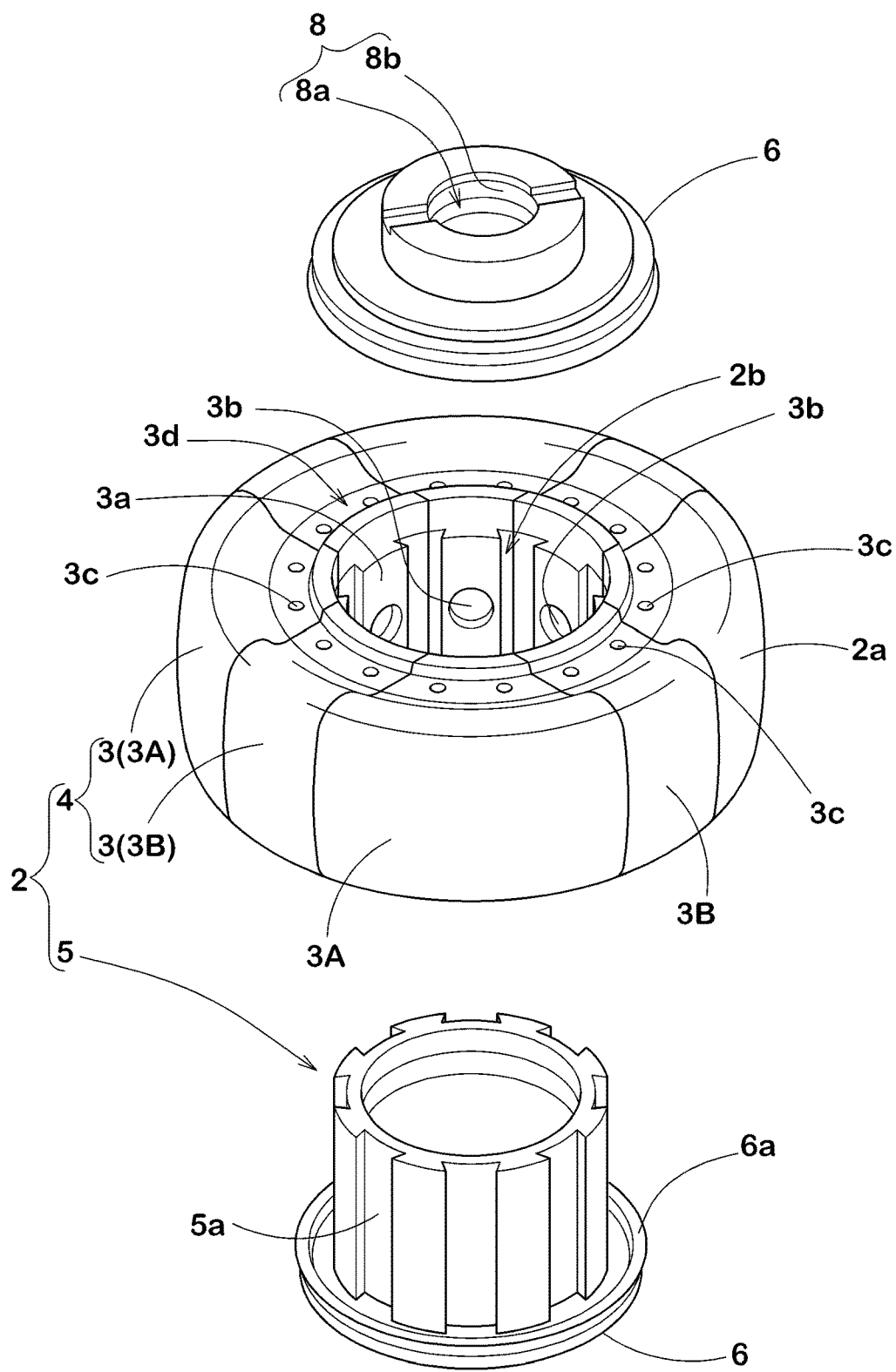
FIG. 4(B) A perspective view of the rigid core mold.

As shown in the cross sectional view in FIG. 4 (A) and the perspective view in FIG. 4 (B), the rigid core mold 2 includes a core main portion 4 in which a plurality of core segments 3 are arraigned in the circumferential direction, and a cylindrical core 5.
Such rigid core mold 2 has an outer surface 2a for vulcanization-molding the inner cavity's surface T1 of the tire T.
The core main portion 4 is in the form of a circular ring having a central hole 2b including the tire revolution axis C.
The core 5 has such shape that it can be fitted in the central hole 2b or can be removed from the central hole 2b by its axial movements.
The rigid core mold 2 in this embodiment is an assembling type and composed of ten core segments 3 and one core 5.
By being mounted on the core 5, the core segments 3 are fixed in the tire radial direction and in the circumferential direction. on the other hand, in the rigid core mold 2 placed in the inner cavity of the tire T, if the core 5 is removed, the core segments 3 are movable inwardly in the radial direction of the tire T in sequence.
As shown in FIG. 4 (B), the core 5 comprises first engaging portions 5a formed in the outer circumferential surface. For example, the first engaging portion 5a is one of a dovetail groove and a dovetail tenon which extends in the tire axial direction, with the same cross-sectional shape.
Each core segment 3 comprises a second engaging portion 3a provided in the inner circumferential surface.
For example, the second engaging portion 3a is the other of the dovetail groove and the dovetail tenon which engages with the first engaging portion 5a of the core 5.
The inner circumferential surface of the core segment 3 is provided with a hole 3b denting outwardly in the tire radial direction.
The hole 3b is formed in an inner circumferential surface protruding inwardly in the tire radial direction or in an inner circumferential surface denting outwardly in the tire radial direction, of the second engaging portion 3a.
In this embodiment, the second engaging portions 3a is a dovetail tenon, and
the hole 3b is formed in the inner surface in the radial direction, of the dovetail tenon.
It is preferable that the hole 3b is formed at a position in the inner surface in the radial direction, of the dovetail tenon, which position shifts toward either side in the tire axial direction.
As shown in FIG. 4 (A), both side faces of each core segment 3 facing the outside in the tire axial direction are respectively provided with for example at least two inserting holes 3c having a predetermined diameter.
The inserting holes 3c are formed in inner end portions 3d in the radial direction, of the respective core segments 3 to be arranged along the circumferential direction of the respective core segments 3.
Here, the inner end portion 3d in the radial direction is a side face, which is not covered with the tire T, in each side face facing the outside in the tire axial direction, of the core segment 3.
The inserting hole 3c is formed with a depth so as not to penetrate the core segment 3.
In this embodiment, as shown in FIG. 4 (B), used as the core segments 3 are a segment 3A and a segment 3B whose outer circumferential surface has a circumferential length shorter than the segment 3A.
These segments 3A and 3B are disposed alternately in the circumferential direction.

The segments 3A and 3B are equal to each other in respect to the circumferential length of the inner circumferential surface. when each core segment 3 is removed from the tire-accompanied rigid core mold G, therefore, one of the segments 3B whose outer circumferential surface has a shorter circumferential length is firstly removed toward the inside in the tire radial direction. Thereafter, it is possible to remove the other core segments 3 toward the inside in the tire radial direction.

As shown in FIG. 4 (A) or FIG. 4 (B), the rigid core mold 2 is provided on both sides in the tire axial direction, of the core 5 with a pair of side plates 6, 6.

Each side plate 6 has an engaging portion 6a engaging with each core segment 3.

By the side plates 6, each core segment 3 is prevented from moving in the tire axial direction.

As shown in FIG. 4 (A), for example, one of a pair of the side plates 6 is fixed to the core 5 by the use of bolts. The other side plate 6 has an engaging device 7 being able to protrude into a concave groove 5b extending in the circumferential direction in the inner circumferential surface of the core 5 for example and is provided detachably on the core 5.

Each side plates 6 is provided in for example the outer surface in the tire axial direction with a connected part 8 to which a connecting part (the details are described later) 17 is detachably connected.

The connected part 8 is made up of
a cylindrical opening 8a formed in the outer surface in the tire axial direction, of each side plate 6, and
a concave groove 8b extending in the circumferential direction in the inner circumferential surface of the opening 8a.

In order to form a green tire, rubber members constituting the tire, for example, inner liner, carcass ply, belt ply, sidewall rubber, tread rubber and the like are applied onto the outer surface 2a of such rigid core mold 2 (more specifically, core main portion 4).

The green tire is vulcanization-molded by a vulcanizer (not shown) together with the rigid core mold 2.

Thereby, a tire-accompanied rigid core mold G is obtained.

As shown in FIG. 1 or FIG. 2, the apparatus 1 has
a core holding unit 10 for taking out the core 5 from the tire-accompanied rigid core mold G and holding it,
a tire holding unit 11 for holding the tire-accompanied rigid core mold G from which the core 5 is taken out,
a segment removing unit 12 for removing a core segment 3 from the tire T of the tire-accompanied rigid core mold G held by the tire holding unit 11, and
a segment assembling unit 13 for mounting the core segment 3 on the core 5 held by the core holding unit 10.

Further, as shown in FIG. 1, the apparatus 1 in this embodiment has
a transfer machine 14 for transferring the rigid core mold 2, and
a forming machine 15 for forming the green tire by applying the rubber members onto the outer surface 2a of the rigid core mold 2.

In this specification, a moving direction of the core holding unit 10 along the horizontal direction is defined as the front-back direction X.

A horizontal direction orthogonal to the front-back direction X is defined as the left-right direction Y.

A vertical direction orthogonal to the front-back direction X and the left-right direction Y is defined as the vertical direction Z.

Figure 5:
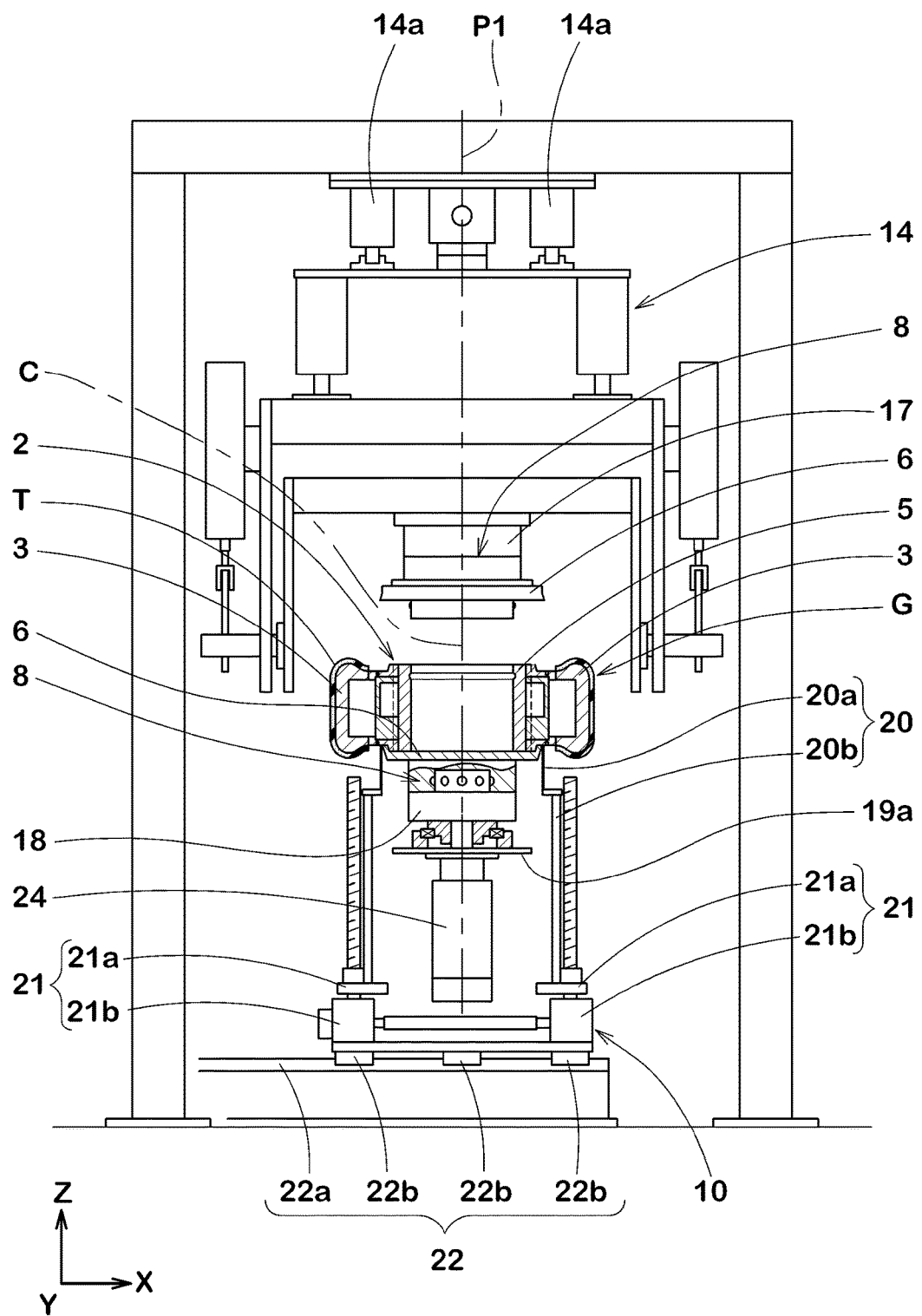
FIG. 5 A side view of the removal device at the transfer station.

As shown in FIG. 5, the transfer machine 14 has a connecting part 17 being able to connect to the connected part 8 of one of the side plates 6.

The transfer machine 14 is movable in the left-right direction Y along a pair of rails 14a.

The transfer machine 14 has an appropriate tilting device, and can tilt the connecting part 17 around a horizontal axis along the front-back direction X.

Therefore, the rigid core mold 2 connected to the connecting part 17 can be tilted into
a vertically oriented state in which the tire revolution axis C extends along the horizontal direction, and
a horizontally oriented state in which the tire revolution axis C extends along the vertical direction z.

As shown in FIG. 4 (A), for example, the connecting part 17 includes
a shaft portion 17a being able to insert in the opening 8a of the connected part 8,
spherical bodies 17b being able to protrude from the outer circumferential surface of the shaft portion 17a,
an appropriate cylinder device (not shown) for protruding the spherical bodies 17b from the outer circumferential surface of the shaft portion 17a and the like. The connecting part 17 further includes an operating device 17c for operating the engaging device 7 of the other side plate 6.

As shown in FIG. 5, for example, the transfer machine 14 transfers the tire-accompanied rigid core mold G lying in the horizontally oriented state to the core holding unit 10. When the tire-accompanied rigid core mold G is transferred to the core holding unit 10, the transfer machine 14 removes the other side plate 6 from the tire-accompanied rigid core mold G by the operating device 17c of the connecting part 17. As shown in FIG. 5, the transfer machine 14 can hold the removed other side plate 6.

As shown in FIG. 1 by virtual line, for example, the transfer machine 14 receives from the core holding unit 10 the rigid core mold 2 took-out from the tire T of the tire-accompanied rigid core mold G and transfers it to the forming machine 15.

At this time, the rigid core mold 2 is transferred in the vertically oriented state.

As shown in FIG. 5, when receiving the rigid core mold 2 from the core holding unit 10, the transfer machine 14 attaches the other side plate 6 to the core main portion 4 with the connecting part 17, and holds it as the rigid core mold 2.

Figure 7:
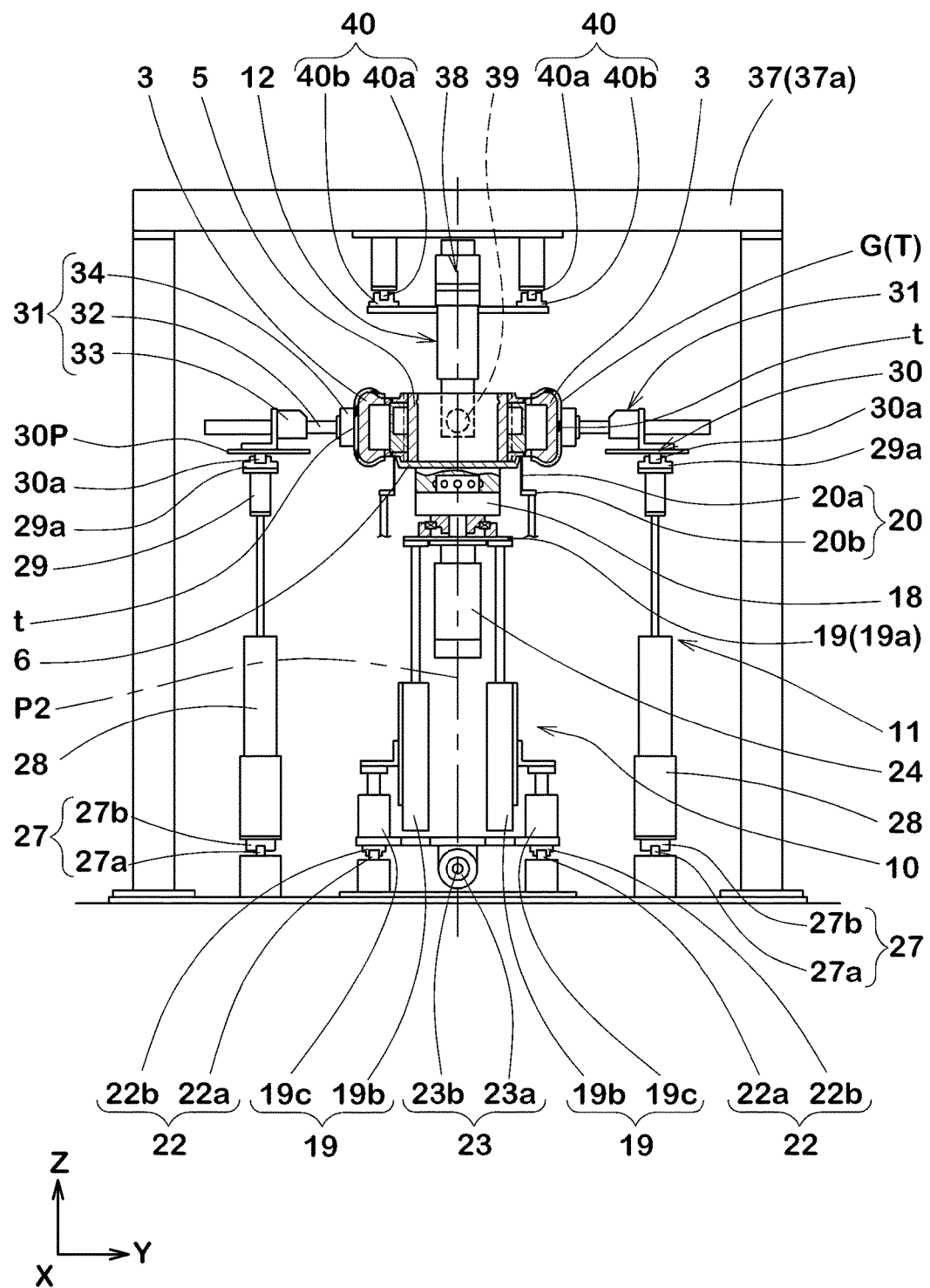
FIG. 7 A front view of the removal device at the disassembly station.

As shown in FIG. 7, the core holding unit 10 includes
a connecting part 18,
a first elevating device 19 for moving up and down the connecting part 18, and
a rotating device 24 for rotating the connecting part 18.

As shown in FIG. 5, the core holding unit 10 includes a core main portion holding section 20 for holding the core main portion 4 of the rigid core mold 2, and
a second elevating device 21 for moving up and down the core main portion holding section 20.

The connecting part 18 can connect to the connected part 8 of one side plate 6 from the underside.

The rotating device 24 rotates the connecting part 18 around an axis line in the vertical direction z.

As shown in FIG. 7, the first elevating device 19 includes
a table 19a supporting a basal part of the connecting part 18,
a pair of right and left first cylinders 19b for moving up and down the table 19a, and
a second cylinder apparatus 19c for moving up and down a supporting part supporting the first cylinders 19b.

As shown in FIG. 5, the second elevating device 21 includes a supporting body 21*a* fixed to the basal part of the core main portion holding section 20, and a jack section 21*b* for moving up and down the supporting body 21*a* along a pair of front and rear supporting columns.

The connecting part 18 of the core holding unit 10 has a similar structure to that of the connecting part 17 of the transfer machine 14. Therefore, its description is omitted herein.

Figure 6:
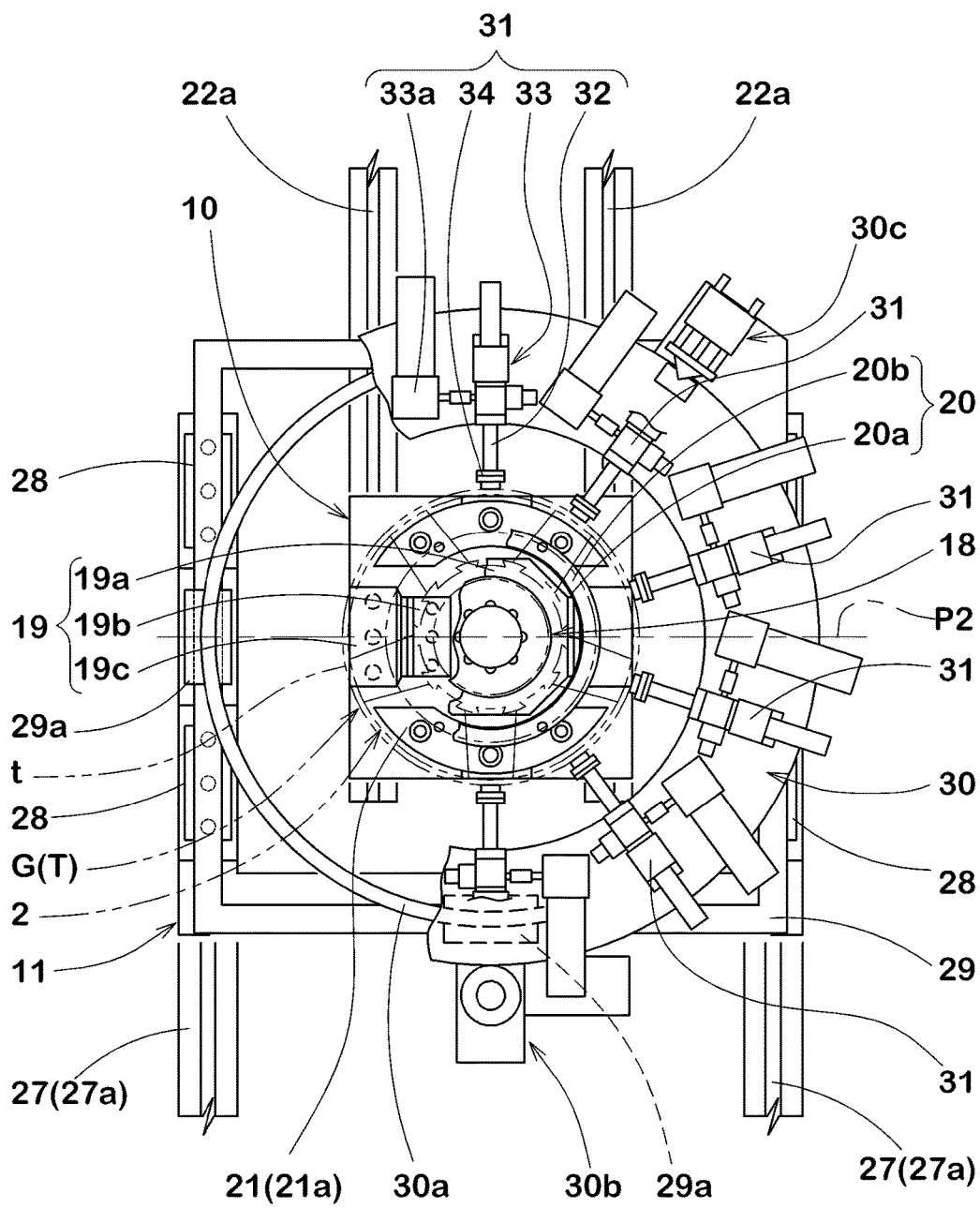
FIG. 6 A plan view of the removal device at the disassembly station.

As shown in FIG. 5 or FIG. 6, the core main portion supporting part 20 is composed of a cylindrical supporting body 20*a*, and a connecting part 20*b* connecting the supporting body 20*a* and the supporting body 21*a* of the second elevating device 21.

Such core main portion holding section 20 holds the side face of the core main portion 4 in the landscape orientation from the underside by the supporting body 20*a*.

The connecting part 18 is moved up and down by the first elevating device 19.

The core main portion holding section 20 is moved up and down by the second elevating device 21.

Namely, the connecting part 18 and the core main portion supporting part 20 are moved up and down independently from each other.

As shown in FIG. 7, the core holding unit 10 moves in the front-back direction X by slide devices 22.

The slide device 22 includes a rail 22*a* extending in the front-back direction X, a slide bearing 22*b* fixed to the basal part of the core holding unit 10 and being slidable on the rail 22*a*, and a drive part 23 for moving the core holding unit 10 along the rail 22*a*.

The drive part 23 includes, for example, a screw shaft 23*a* extending in the front-back direction X along the rail 22*a*, a bearing nut 23*b* fixed to the basal part of the core holding unit 10, a motor (not shown) for rotationally driving the screw shaft 23*a* and the like.

The drive part 23 stops the core holding unit 10 at a predetermined position of the rail 22*a*.

As shown in FIG. 1, the drive part 23 stops the core holding unit 10, for example, at a transfer station P1, a disassembly station P2, and an assembly station P3.

The transfer station P1 is, for example, a position where the tire-accompanied rigid core mold G is transferred between the core holding unit 10 and the transfer machine 5.

The disassembly station P2 is a position where the tire-accompanied rigid core mold G is transferred from the core holding unit 10 to the tire holding unit 11.

The assembly station P3 is a position where the core holding unit 10 receives the core segment 3 from the segment assembling unit 13 and the core main portion 4 is assembled.

As shown in FIG. 5, at the transfer station P1, the core holding unit 10 can receive the tire-accompanied rigid core mold G from the transfer machine 14, for example, by connecting the connecting part 18 to the connected part 8 of the one side plate 6.

As shown in FIG. 6, the core holding unit 10 moves in the front-back direction X on the rails 22*a*, and conveys the tire-accompanied rigid core mold G to the disassembly station P2. As shown in FIG. 7, at the disassembly station P2, the core holding unit 10 moves up the tire-accompanied rigid core mold G by the first elevating device 19 and the second elevating device 21, and lets the tire holding unit 11 hold the tire-accompanied rigid core mold G.

Next, the core holding unit 10 moves the connecting part 18 downwardly by the first elevating device 19 and takes out the core 5 from the tire-accompanied rigid core mold G together with one side plate 6.

After the core main portion supporting part 20 has been moved down, the core holding unit 10 moves in the front-back direction X on the rails 22*a* and conveys the core 5 to the assembly station P3.

Figure 8:
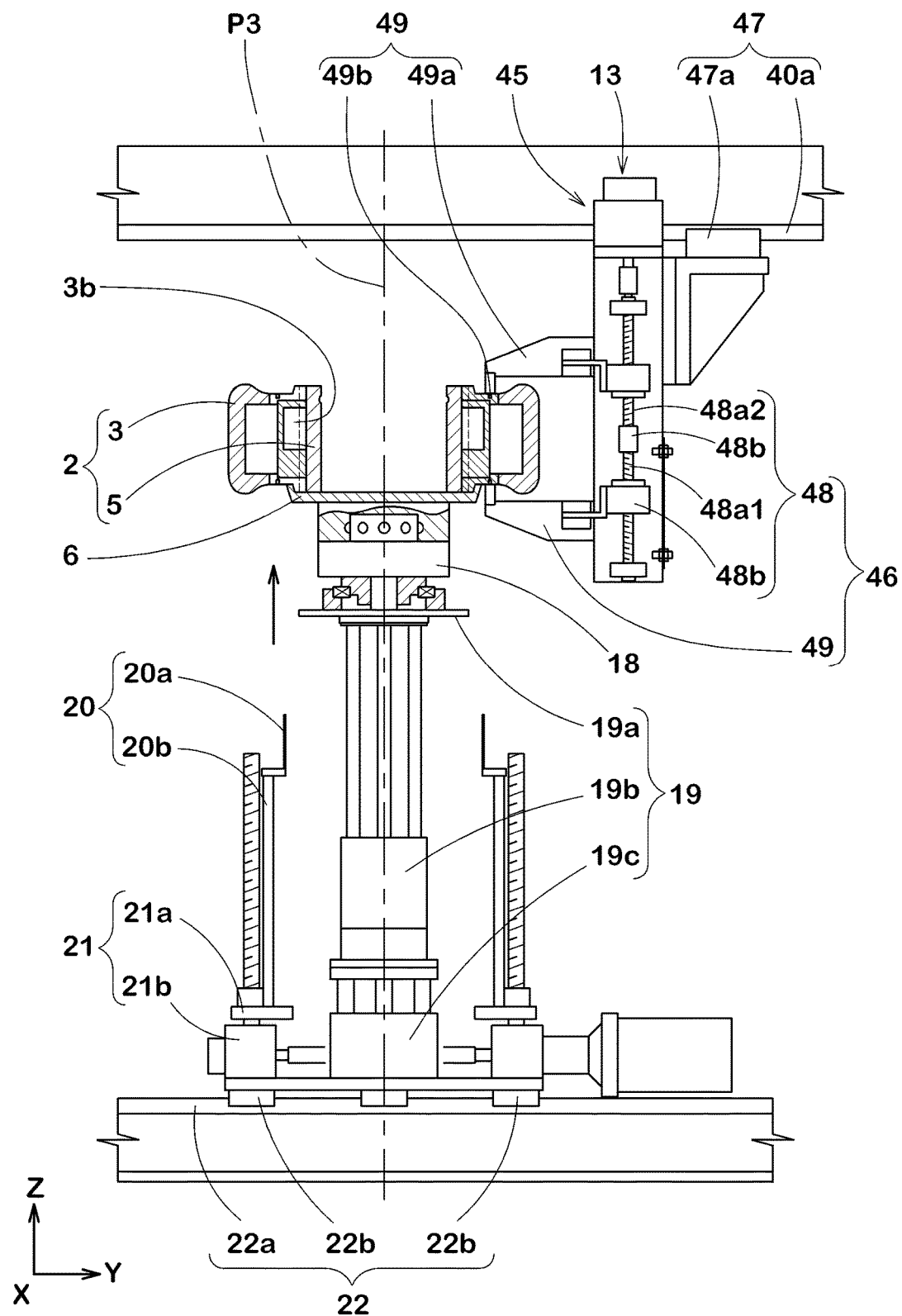
FIG. 8 A side view of the removal device at the disassembly station.

As shown in FIG. 8, at the assembly station P3, the core holding unit 10 moves up the core 5 by the first elevating device 19.

Further, the core holding unit 10 rotates the core 5.

Thereby, the core holding unit 10 receives the core segments 3 from the segment assembling unit 13 in series.

After the rigid core mold 2 is assembled, the core holding unit 10 moves to the transfer station P1, and transfers the rigid core mold 2 to the transfer machine 14 as shown in FIG. 5.

As shown in FIG. 6 or FIG. 7, for example, by pressing, from radially outside, a tread portion t of the tire T of the tire-accompanied rigid core mold G held by the core holding unit 10, the tire holding unit 11 holds the tire-accompanied rigid core mold G.

The tire holding unit 11 in this embodiment is provided as being movable in the front-back direction X by slide devices 27.

As shown in FIG. 7, the slide device 27 includes a rail 27*a* extending in the front-back direction X, a slide bearing 27*b* fixed to the basal part of the tire holding unit 11 and being slidable on the rail 27*a*, and an appropriate drive part (not shown) for moving the tire holding unit 11 along the rail 27*a*.

Figure 9:
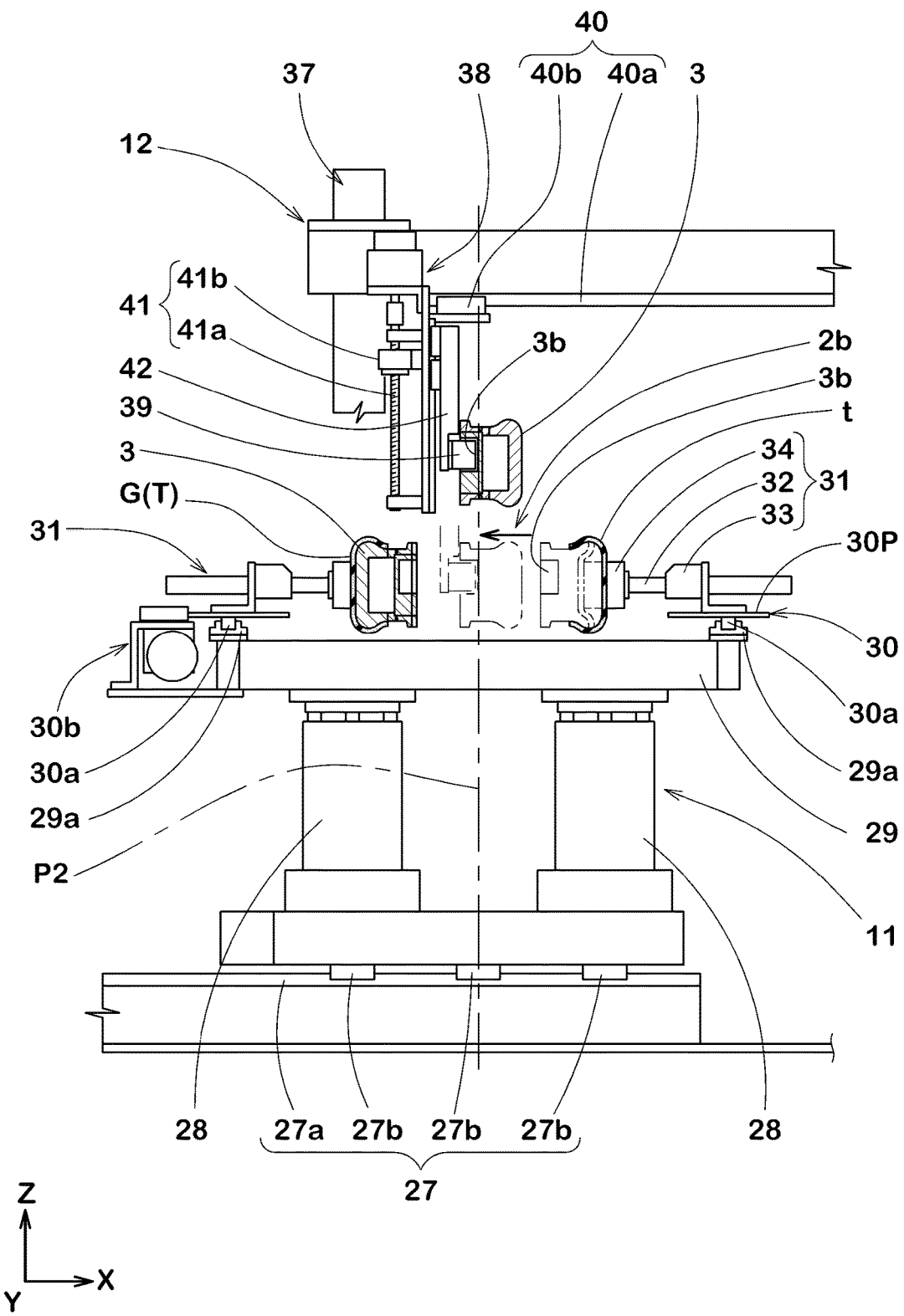
FIG. 9 A partially enlarged side view of the removal device at the assembly station.

As shown in FIG. 9, the tire holding unit 11 includes a plurality of cylinder devices 28 provided uprightly from a frame to which the slide bearings 27*b* are fixed, a frame 29 in the form of a frame connecting the upper end portions of the cylinder devices 28 in the front-back direction and the left-right direction, an annular frame part 30 disposed above the frame 29, and a plurality of tread pushers 31 provided on the annular frame part 30.

As shown in FIG. 7 or FIG. 9, the tire holding unit 11 includes two cylinder devices 28 on each rail 27*a*.

As shown in FIG. 6, the frame 29 is formed in the form of a rectangle connecting the outer end portions of these cylinder devices 28.

on the upper surface of the frame 29, a rail 29*a* for supporting the annular frame part 30 is disposed.

The annular frame part 30 includes an annular plate 30P, and an annular slide bearing 30*a* fixed to the under surface thereof.

The annular plate 30P has an inside diameter more than the outside diameter of the tire-accompanied rigid core mold G. The annular slide bearing 30*a* is slidable along the arc-shaped rail 29*a*.

The annular frame part 30 in this embodiment includes a drive part 30*b* for rotating the annular plate 30P, and a lock part 30*c* for locking the rotation of the annular plate 30P.

Therefore, the annular frame part 30 can rotate the annular plate 30P around an axis in the vertical direction Z.

The drive part 30*b*, for example, includes a rotating roller contacting with the outer circumferential surface of the annular plate 30P.

By the rotation of the rotating roller, the annular plate 30P is rotated.

The tread pushers 31 are, for example, arranged on the top of the annular plate 30P at predetermined intervals in a radial pattern.

The tread pushers 31 press, from the outside, the tread portion t of the tire-accompanied rigid core mold G lying in the horizontally oriented state, and hold it.

In this embodiment, ten tread pushers 31 are arranged on the annular plate 30P of the annular frame part 30 at angularly equal intervals.

Each tread pusher 31 has
an actuator 33 having a rod 32 extensible in the tire radial direction, and
a pad 34 fixed to the rod 32 of the actuator 33 for contacting with the tread portion t of the tire-accompanied rigid core mold G.

The actuator 33 is driven by a motor 33a (shown in FIG. 6) associated with each tread pusher 31.

As shown in FIG. 9, each tread pusher 31 can change the extension amount of the rod 32. In this embodiment, the extension amount of the rod 32 can be adjusted to
an extension amount at the time of pressing in order to press the tread portion t of the tire-accompanied rigid core mold G, and
an extension amount at the time of pushing out which is larger than the extension amount at the time of pressing in order to push out the core segment 3 inwardly in the tire radial direction through the tread portion t.

The tire holding unit 11 rotates the tire-accompanied rigid core mold G by rotating the annular plate 30P of the annular frame part 30.

Thereby, the segment removing unit 12 can take out each core segment 3 from the predetermined same position.

As shown in FIG. 7 or FIG. 9, the segment removing unit 12 has an immovable frame part 37 fixed to the floor, a movable part 38 movable in the front-back direction X in relation to the frame part 37, and
a chuck part 39 being able to couple with a hole 3b provided in the radially inner circumferential surface of each core segment 3. The chuck part 39 is provided in a lower end side of the movable part 38.

Figure 11:
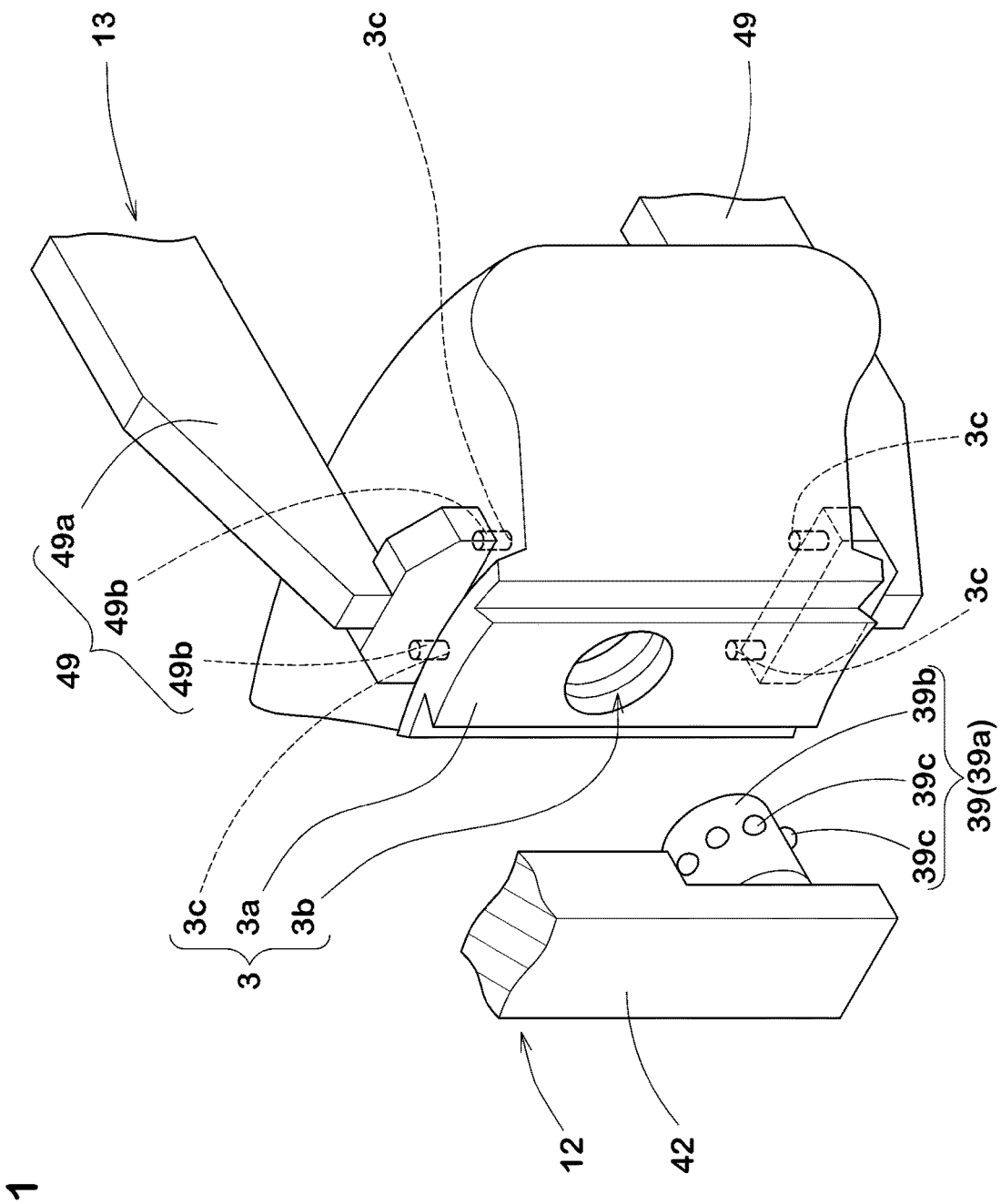
FIG. 11 A side view of the removal device at the assembly station.

As shown in FIG. 11, for example, the chuck part 39 has the hole 3b provided in the inner circumferential surface of each core segment 3, and a coupling device 39a capable of fixing and releasing.

More specifically, the coupling device 39a includes
a shaft portion 39b being able to insert in the hole 3b, spherical bodies 39c disposed in the outer circumferential surface of the shaft portion 39b,
a projecting and retreating device (not shown) for projecting and retreating the spherical bodies 39c, and
a groove portion formed in the inner circumferential surface of the hole 3b along the circumferential direction.

As shown in FIG. 3 or FIG. 7, for example, the frame part 37 includes a pair of front and rear portal frames 37a standing on the floor so as to stride over the core holding unit 10 and the tire holding unit 11 in the left-right direction Y. As shown in FIG. 1, the frame 37 includes a pair of right and left upper frames 37b connecting between the frames 37a in the front-back direction X.

Figure 10:
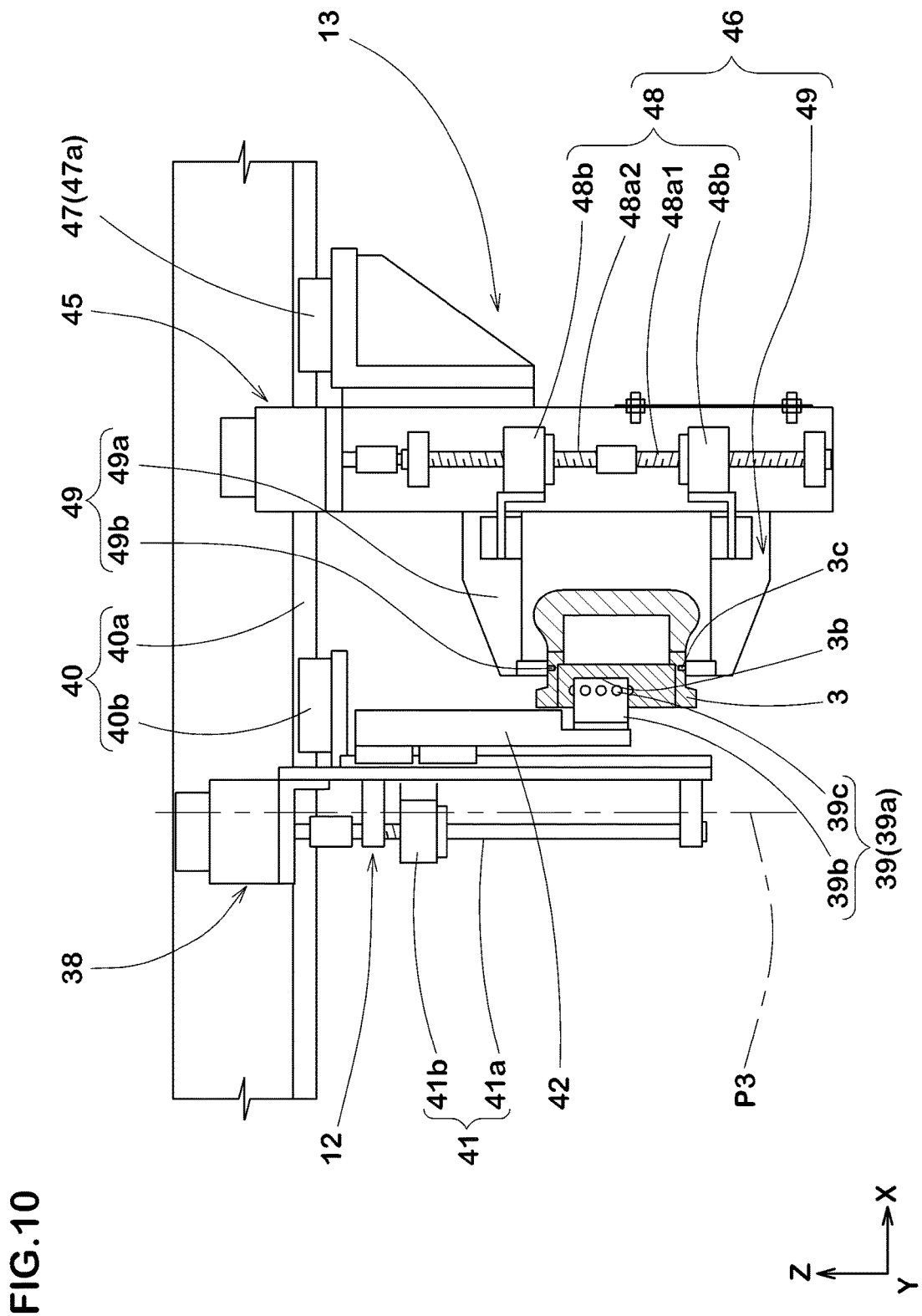
FIG. 10 A perspective view of the core segment when the removal device is at the assembly station.

As shown in FIG. 9 or FIG. 10, the movable part 38 is provided movably in the front-back direction X by a slide device 40.

In this embodiment, by the slide device 40, the movable part 38 is movable in the front-back direction X between the disassembly station P2 and the assembly station P3.

As shown in FIG. 7, FIG. 9 or FIG. 10, the slide device 40 includes
a pair of right and left rail members 40a fixed to the frame part 37, and
slide bearings 40b engaging with the rail members 40a.

The movable part 38 is supported by the frame part 37 through the slide device 40.

The slide device 40 further includes
a screw shaft (not shown) for moving in the front-back direction X the part 38 movable along the rail members 40a,
a bearing nut (not shown) rotation attached to the screw shaft, and
a motor (not shown) for rotating the screw shaft.

As shown in FIG. 9 or FIG. 10, the movable part 38 in this embodiment includes
an elevating device 41 whose upper end portion is fixed to the slide device 40, and
a supporting part 42 supported movably up and down by the elevating device 41.

The elevating device 41 includes for example
a screw shaft 41a extending in the vertical direction Z, and
a bearing nut 41b coupled with the supporting part 42 and rotation attached to the screw shaft 41a.

The supporting part 42 is for example a platy member extending in the vertical direction Z.

The bearing nut 41b is coupled with one of faces of the supporting part 42 which are opposite in the front-back direction X, and
the chuck part 39 is provided in a lower end portion of the other face.

As shown in FIG. 9, at the disassembly station P2, the segment removing unit 12 downwardly moves the chuck part 39 by the elevating device 41.

From the central hole 2b of the rigid core mold 2, the chuck part 39 enters into a position opposed to the hole 3b of the core segment 3 of the core main portion 4 of the tire-accompanied rigid core mold G.

Next, by the slide device 40, the segment removing unit 12 moves the movable part 38 along the front-back direction X to the tire radius outside in relation to the core main portion 4.

Thereby, the chuck part 39 is inserted into the hole 3b of the core segment 3.

Next, by actuating the chuck part 39, the segment removing unit 12 and the core segment 3 are connected.

Thereafter, by the move of the movable part 38 in the front-back direction X due to the slide device 40, the segment removing unit 12 moves inwardly in the tire radial direction.

Thereby, as shown in FIG. 9 by virtual line, the core segment 3 connected with the chuck part 39 is taken out from the tire T.

The took-out core segment 3 is moved up by the elevating device 41.

Thereafter, the core segment 3 is conveyed to the assembly station P3 by the slide device 40.

As shown in FIG. 8 or FIG. 10, the segment assembling unit 13 has
a movable part 45 movable along the rail members 40a, and
a clamp part 46 provided on the movable part 45.

The segment assembling unit 13 in this embodiment has, for example, a slide device 47 including slide bearings 47a engaging with the rail members 40a.

The slide device 47 includes a screw shaft (not shown) for moving the movable part 45 in the front-back direction X along the rail members 40a, a bearing nut (not shown) rotation attached to the screw shaft, and a motor (not shown) for rotating the screw shaft.

The movable part 45 is supported by the rail members 40a through the slide device 47.
Namely, the movable part 45 is provided movably in the front-back direction X along the rail members 40a by the slide device 47.
As shown in FIG. 10, the slide device 40 and the slide device 47 include the rail members 40a in common.
Therefore, the screw shaft of the slide device 47 is butted in the front-back direction X with the screw shaft of the slide device 40.
The bearing nut of the slide device 47 is coupled with the movable part 45.

The clamp part 46 includes
a pair of upper and lower clamps 49 coupled with the movable part 45, and
a clamp device 48 for actuating the clamps 49.
The clamp device 48 includes
screw shafts 48a1, 48a2 extending in the vertical direction Z, and changed in the direction of helix of the thread at an intermediate position in the up-down direction, and
a pair of upper and lower bearing nuts 48b coupled with the respective clamps 49 and rotation attached to the respective screw shafts 48a1, 48a2 one above the other separately.

As shown in FIG. 11, for example, each clamp 49 includes a horizontal member 49a extending in the front-back direction X from the bearing nut 48b, and
at least one pair of right and left protrusions 49b formed at the tip of the horizontal member 49a.
The protrusions 49b extend toward the inside along the vertical direction Z to be opposite to each other and can be inserted in the inserting holes 3c of each core segment 3.

As shown in FIG. 10, at the assembly station P3 for example, the segment assembling unit 13 approaches the core segment 3 held by the chuck part 39 from the radially outside by the clamp part 46.
Thereafter, the segment assembling unit 13 clamps the core segment 3 from the both sides in the tire axial direction.
Thereafter, the segment removing unit 12 releases the coupling of the core segment 3 by the chuck part 39, and moves the movable part 38 toward the disassembly station P2 side in the front-back direction X by the slide device 40.
Thereby, the core segment 3 is transferred from the segment removing unit 12 to the segment assembling unit 13.

As shown in FIG. 8, the segment assembling unit 13 clamping the core segment 3 waits at the assembly station P3. At the assembly station P3, with respect to the core segment 3 clamped by the segment assembling unit 13, the core 5 is moved upward by the first elevating device 19 of the core holding unit 10.
The core segment 3 and the core 5 are aligned beforehand so as to be concentric.
Thereby, the core segment 3 is mounted on the core 5 by engaging the first engaging portions 5a and the second engaging portions 3a with each other.
After the core segment 3 is mounted on the core 5, the segment assembling unit 13 releases the clamping of the core segment 3 by the clamp device 48, and
moves from the assembly station P3 toward the transfer station P1 side (right side in FIG. 8) by the slide device 47.
Thereafter, the core holding unit 10 downwardly moves the core 5 by the first elevating device 19.

As shown in FIG. 1, the apparatus 1 in this embodiment has the core holding unit 10 for taking out the core 5 from the tire-accompanied rigid core mold G and holding it, the tire holding unit 11 for holding the tire-accompanied rigid core mold G from which the core 5 is taken out, the segment removing unit 12 for taking out the core segment 3 from the tire T held by the tire holding unit 11, and the segment assembling unit 13 for receiving the core segment 3 from the segment removing unit 12 and for assembling the core segment 3 onto the core 5. Accordingly, it is possible to assemble a new rigid core mold 2 at the assembly position P3, while removing the rigid core mold 2 from the tire T of the tire-accompanied rigid core mold G. Therefore, the burden on the worker is greatly alleviated.

Figure 12:
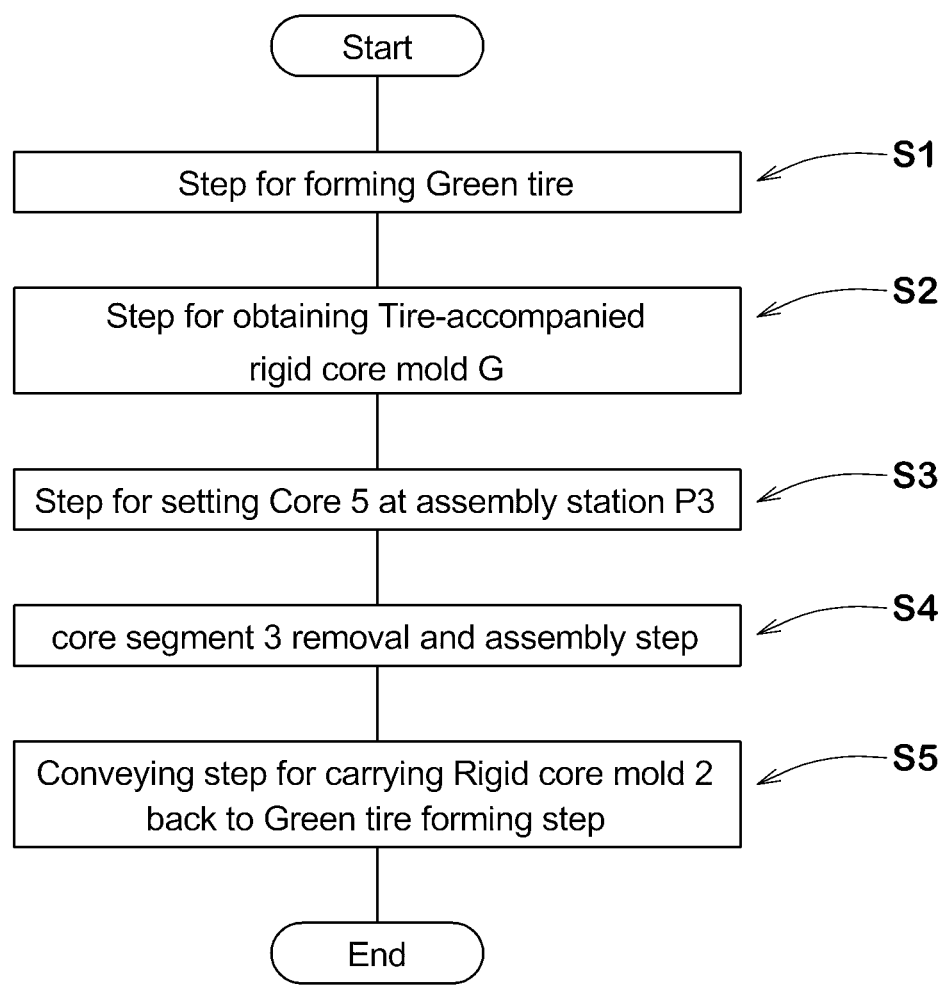
FIG. 12 A flowchart for explaining a tire manufacturing method.
Figure 13:
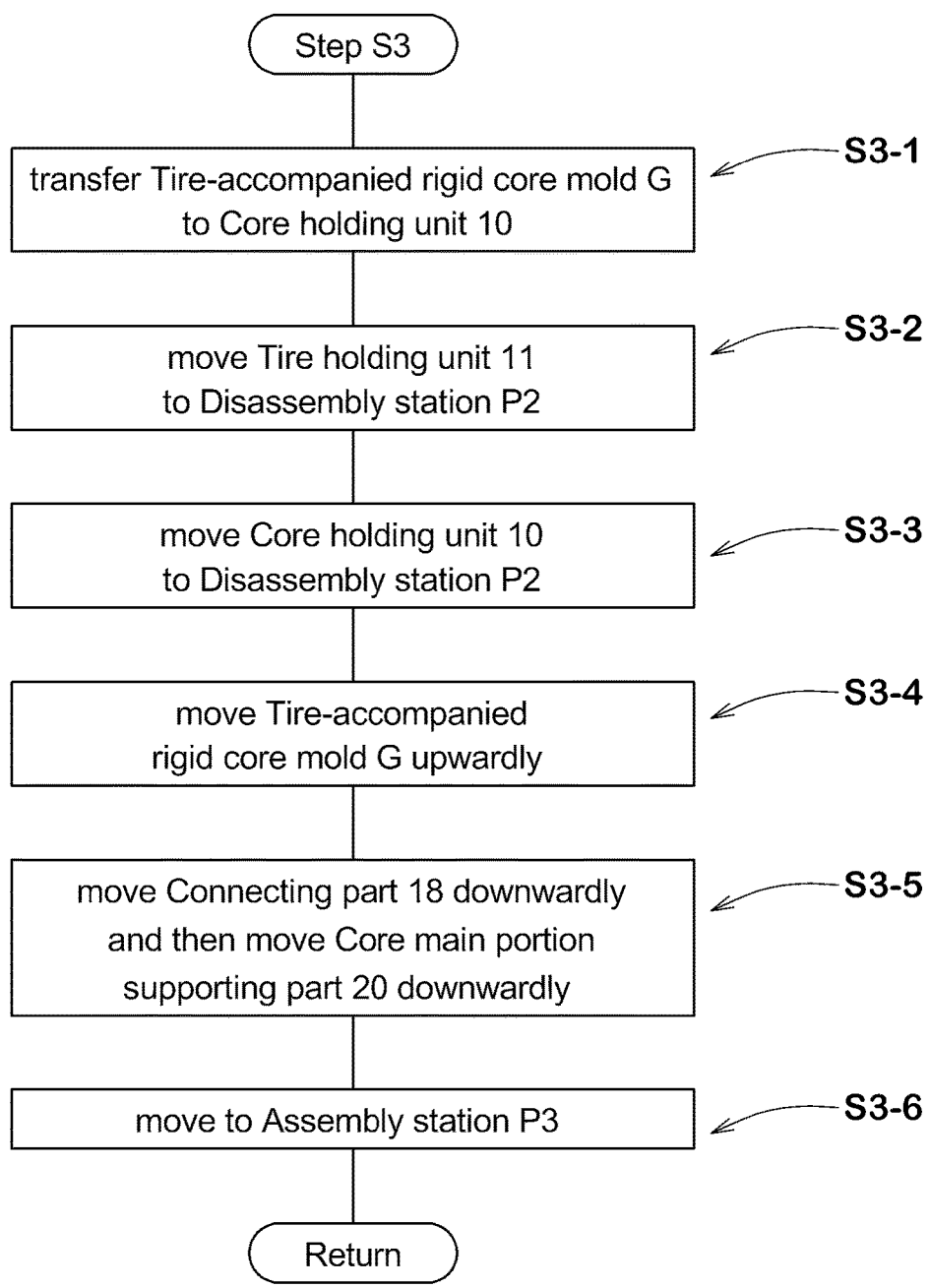
FIG. 13 A flowchart for explaining a step for setting the core at the assembly station.

A tire manufacturing method utilizing the apparatus 1 constructed as above is as follows.
In FIG. 12-FIG. 15, shown are flowcharts for explaining the tire manufacturing method in this embodiment. As shown in FIG. 12, in the method for manufacturing in this embodiment, firstly, a step S1 for forming a green tire on the outside of the rigid core mold 2 is performed.
In the step S1, tire construction members which are an inner liner, carcass ply and the like are applied in series onto the outer surface 2a of the rigid core mold 2, and the green tire is formed.
Next, performed is a step S2 for obtaining the tire-accompanied rigid core mold G by vulcanization-molding the green tire together with the rigid core mold 2. And, the green tire is vulcanization-molded, and the tire-accompanied rigid core mold G is formed.
Next, performed is a step S3 for taking out the core 5 from the tire-accompanied rigid core mold G and setting the core 5 at the assembly station P3.
Here, the core 5 is united with one side plate 6a.
The details of the step S3 are shown in FIG. 13.
In the step S3, firstly, the tire-accompanied rigid core mold G obtained in the step S2 is conveyed to the transfer machine 14, for example by a carriage (not shown).
The transfer machine 14 moves the received tire-accompanied rigid core mold G to the transfer station P1.
At the transfer station P1, the tire-accompanied rigid core mold G lying the horizontally oriented state is transferred to the core holding unit 10 (S3-1).
At this time, the forming machine 14 removes the other side plate 6 from the tire-accompanied rigid core mold G.
The tire holding unit 11 moves to the disassembly station P2 (S3-2).
At this time, the tire holding unit 11 has moved upward the frame 29 to the highest position by the cylinder device 28 (shown in FIG. 7).
The core holding unit 10 moves to the disassembly station P2 by the drive part 23, while holding the tire-accompanied rigid core mold G (S3-3).
At this time, for example, the core holding unit 10 downwardly moves the connecting part 18 by the first elevating device 19, and downwardly moves the core main portion holding section 20 by the second elevating device 21, and holds the tire-accompanied rigid core mold G at the lowest position by the connecting part 18 and the core main portion holding section 20.
Therefore, the core holding unit 10 and the tire holding unit 11 can move to the disassembly station P2 in a concentric state without the tire holding unit 11 contacting with the core holding unit 10 or the tire-accompanied rigid core mold G.
After the core holding unit 10 and the tire holding unit 11 has moved to the disassembly station P2, the core holding unit 10 upwardly moves the connecting part 18 by the first elevating device 19, and upwardly moves the core main portion holding section 20 by the second elevating device 21.
Thereby, the tire-accompanied rigid core mold G is moved upward (S3-4).

Next, one core segment 3 is moved inwardly in the tire radial direction from the tire-accompanied rigid core mold G from which the core 5 is taken out, and is removed from the tire T. The took-out core segment 3 is mounted on the core 5 set at the assembly station P3 (removal and assembly step S4).

Figure 14:
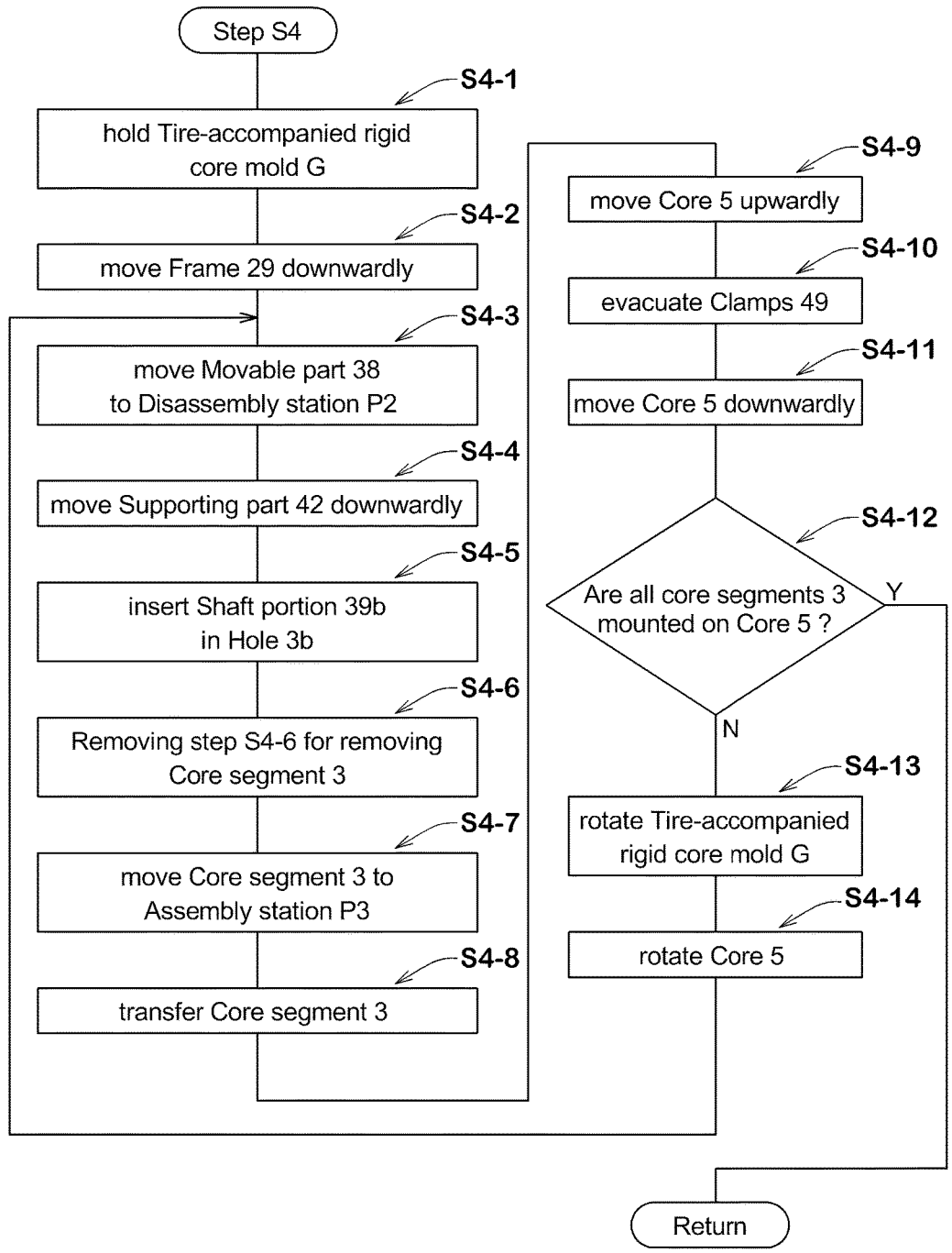
FIG. 14 A flowchart for explaining a core segment removal and assembly step.

The details of the step S4 are shown in FIG. 14.

In the step S4, firstly, the tread portion t of the tire T of the tire-accompanied rigid core mold G moved upwardly by the core holding unit 10, is pressed by the tread pusher 31 from the radially outside.

Thereby, the tire-accompanied rigid core mold G is held by the tire holding unit 11 (S4-1).

At this time, it is preferable that the position of the annular plate 30P of the annular frame part 30 is adjusted beforehand by the drive part 30b, and thereby the respective tread pushers 31 are positioned at the positions of the respective core segments 3 of the tire-accompanied rigid core mold G. By the adjustment of the position of each tread pusher 31, each tread pusher 31 can press each core segment 3 through the tread portion t of the tire T of the tire-accompanied rigid core mold G.

As shown in FIG. 1, the tire holding unit 11 in this embodiment stops the predetermined tread pusher 31 at a position on a line passing through the center of the annular frame part 30 along the front-back direction X.

The core holding unit 10 rotates the tire-accompanied rigid core mold G by the connecting part 18 so that the center line of the predetermined core segment 3 coincides with a line along the front-back direction X.

After the positions of the tread pushers 31 are adjusted, the tire holding unit 11 may lock the rotation of the annular plate 30P of the annular frame part 30 by the lock part 30c.

As shown in FIG. 13, in the step S3-5, after the tire holding unit 11 holds the tire-accompanied rigid core mold G, the core holding unit 10 downwardly moves the connecting part 18 by the first elevating device 19.

As the tire-accompanied rigid core mold G is upwardly moved by the tire holding unit 11 and the core main portion supporting part 20, the core holding unit 10 can remove the core 5 together with one side plate 6 from the tire-accompanied rigid core mold G with the downward move of the connecting part 18.

At this time, the core main portion supporting part 20 supports the rigid core mold G from the underside, and the taking-out of the core 5 is performed stably.

The core holding unit 10 having taken out the core 5 downwardly moves the core main portion supporting part 20 by the second elevating device 21.

Thereby, in a state moved downwardly to the lowest position, the connecting part 18 and the core main portion supporting part 20 are moved to the assembly station P3 (S3-6).

As shown in FIG. 14, after the core holding unit 10 has moved from the disassembly station P2, the tire holding unit 11 holding the tire-accompanied rigid core mold G downwardly moves the frame 29 by the cylinder device 28.

Thereby, the tire-accompanied rigid core mold G moves downward (S4-2).

After the tire-accompanied rigid core mold G has been moved downward, the segment removing unit 12 moves the movable part 38 to the disassembly station P2 by the slide device 40 (S4-3).

Next, the segment removing unit 12 downwardly moves the supporting part 42 by the elevating device 41 so that the shaft portion 39b of the chuck part 39 and the hole 3b of the core segment 3 become at the same position in the vertical direction Z (S4-4).

At this time, the center line of any core segment 3 is positioned on a line passing through the center of the annular frame part 30 and extending along the front-back direction X. Therefore, the shaft portion 39b and the hole 3b are faced to each other by being matched with respect to the positions in the vertical direction Z.

If it is confirmed that the shaft portion 39b of the chuck part 39 and the hole 3b of the core segment 3 have been faced to each other, the segment removing unit 12 moves the movable part 38 along the front-back direction X by the slide device 40.

Thereby, the shaft portion 39b is inserted in the hole 3b (S4-5). After the shaft portion 39b has been inserted in the hole 3b, the chuck part 39 protrudes the spherical bodies 39c into the groove portion of the hole 3b.

Thereby, the chuck part 39 is integrally fixed to the core segment 3.

Next, a removing step S4-6 for removing the core segment 3 is performed, pressing a tread portion t positioned on the outside in the tire radial direction of the core segment 3 to be removed, toward the inside in the tire radial direction from the outside in the tire radial direction.

In this embodiment, the rod 32 of the tread pusher 31 for pressing the core segment 3 with which the chuck part 39 is engaged, is further extended.

Thereby, the core segment 3 is pushed out inwardly in the tire radial direction.

In this connection, the segment removing unit 12 moves the movable part 38 inwardly in the tire radial direction along the front-back direction X by the slide device 40.

Thereby, the core segment 3 is moved in a direction to be removed from the tire-accompanied rigid core mold G.

Therefore, the core segment 3 is removed from the tire T of the tire-accompanied rigid core mold G.

If it is confirmed that the core segment 3 has been taken out inwardly in the tire radial direction, the segment removing unit 12 upwardly moves the core segment 3 by the elevating device 41.

Next, by the slide device 40, the movable part 38 is moved to the assembly station P3.

Thereby, the core segment 3 is moved to the assembly station P3 (S4-7).

At the assembly station P3, the segment removing unit 12 transfers the core segment 3 to the segment assembling unit 13 (S4-8).

Specifically, the segment assembling unit 13 waits at the assembly station P3, while largely spacing between the clamps 49 of the clamp part 46 one above the other.

The segment removing unit 12 positions the core segment 3 between the clamps 49 by moving the movable part 38 to the assembly station P3.

Namely, the core segment 3 enters between the clamps 49 from the outside in the tire radial direction.

If it is confirmed that the core segment 3 exists at the assembly station P3, the segment assembling unit 13 makes a pair of the clamps 49 approach each other.

Thereby, the protrusion 49b of each clamps 49 is inserted in the inserting hole 3c of the core segment 3, and the core segment 3 is clamped.

Next, the segment removing unit 12 releases the clamping of the core segment 3 by the chuck part 39.

Next, by the slide device 40, the movable part 38 moves in a direction away from the segment assembling unit 13.

Thereby, the shaft portion 39b of the chuck part 39 is removed from the hole 3b of the core segment 3.

The segment assembling unit 13 clamps so that the second engaging portions 3a of the core segment 3 are exposed to the outside in the front-back direction X.

If it is confirmed that the core segment 3 has been clamped by the segment assembling unit 13 and the segment removing unit 12 has moved toward the disassembly station P2 side, as shown in FIG. 8, the core holding unit 10 upwardly moves the connecting part 18 by the first elevating device 19.

Thereby, the core 5 moves upward (S4-9).

As the core 5 moves upward, the first engaging portions 5a of the core 5 and the second engaging portions 3a of the core segment 3 are fitted to each other.

If the fitting of the core 5 and the core segment 3 is confirmed, the respective clamps 49 are separated up and down, and the movable part 45 is moved in a direction away from the core holding unit 10 by the slide device 47.

Thereby, the clamps 49 are evacuated (S4-10).

If it is confirmed that the clamps 49 are evacuated from the assembly station P3, the core holding unit 10 downwardly moves the connecting part 18 by the first elevating device 19. Thereby, the core 5 moves downward (S4-11).

A removal and assembly step S4 for the core segment 3 is performed with respect to all of the core segments 3 in the tire T.

For that purpose, the tire holding unit 11 holding the tire-accompanied rigid core mold G or the core holding unit 10 holding the core 5 checks the number of the core segments 3 included in the tire-accompanied rigid core mold G, and judges if all of the core segments 3 have been taken out from the tire-accompanied rigid core mold G or the core segments 3 have been mounted on the core 5 (S4-12).

At this time, if it is confirmed that the tire-accompanied rigid core mold G includes no core segment 3, then the removal and assembly step S4 is ended.

If it is confirmed that the tire-accompanied rigid core mold G includes the core segment 3, then the tire holding unit 11 rotates the annular plate 30P of the annular frame part 30 by the drive part 30c.

Thereby, the tire-accompanied rigid core mold G is rotated (S4-13).

By the step S4-13, it is possible to accord the center line of the core segment 3 to be removed next with a line along the front-back direction X.

Accordingly, the core segment 3 is removed in series from the predetermined same position, namely, a position on a line passing through the center of the annular frame part 30 and extending along the front-back direction X.

The core holding unit 10 rotates the connecting part 18 by the rotating device 24.

Thereby, the core 5 is rotated around the tire revolution axis C (S4-14).

By the step S4-14, the core segment 3 is mounted on the core 5 at the predetermined same position, namely, at a position on a line passing through the center of the core 5 and extending along the front-back direction X.

The core main portion 4 in this embodiment is formed from ten core segments 3.

Therefore, the core holding unit 10 and the tire holding unit 11 rotate the core 5 or the tire-accompanied rigid core mold G by 36 degrees at a time.

As explained above, according to this embodiment, a new rigid core mold 2 is assembled at the assembly station P3, while removing the core segment 3 from the tire-accompanied rigid core mold G.

The tire T from which all of the core segments 3 have been removed and which is remained in the tire holding unit 11, is conveyed, for example by the slide device 27, to a tire carry-out port (not shown) and carried out by appropriate means.

Next, a conveying step S5 is performed which is for carrying the rigid core mold 2 assembled at the assembly station P3 back to the step S1 for forming the green tire.

Figure 15:
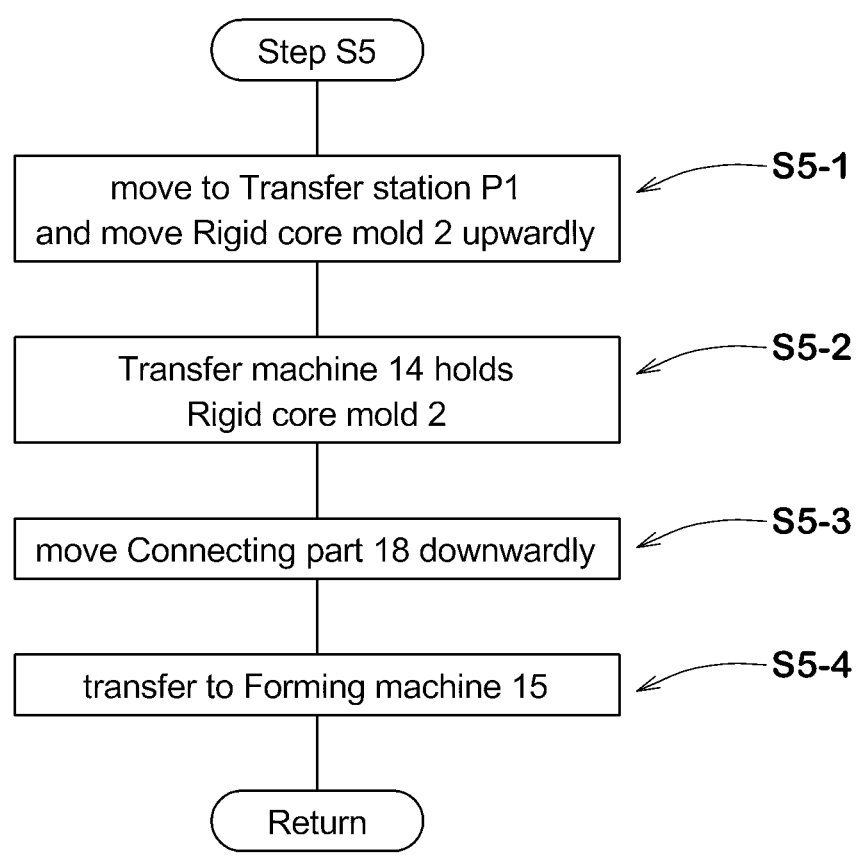
FIG. 15 A flowchart for explaining a conveying step.
Figure 16:
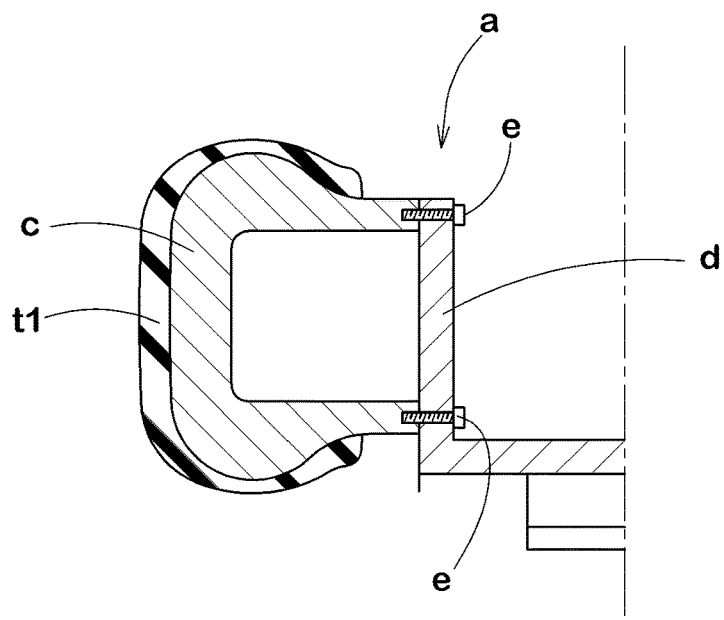
FIG. 16 (A) is a cross sectional view of a conventional rigid core mold, and (B) is a plan view of the same rigid core mold.
Figure 16:
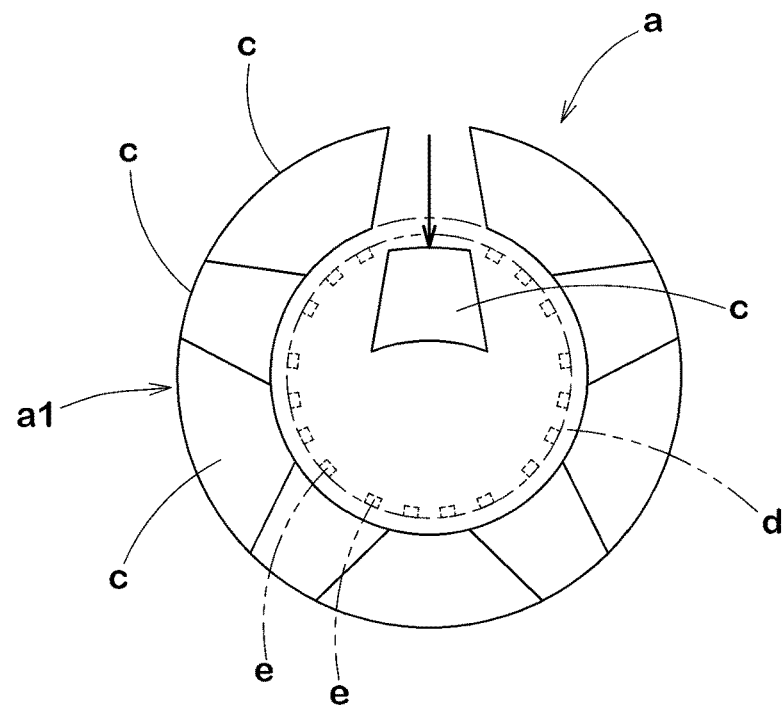

The details of the step S5 are shown in FIG. 15.

In the step S5, firstly, the core holding unit 10 holding the rigid core mold 2 in which all of the core segments 3 have been mounted on the core 5 in the removal and assembly step S4, is moved to the transfer station P1 by the slide device 22.

Thereby, the rigid core mold 2 is moved to the transfer station P1.

Then, at the transfer station P1, the core holding unit 10 upwardly moves the connecting part 18 by the first elevating device 19.

Thereby, the rigid core mold 2 is moved upward (S5-1).

If it is confirmed that the rigid core mold 2 has been moved upward, the transfer machine 14 holds the rigid core mold 2 by the connecting part 17 (S5-2).

At this time, as the connecting part 17 is connected to the other side plate 6, the transfer machine 14 holds the rigid core mold 2, and the other side plate 6 is mounted on the rigid core mold 2.

If it is confirmed that the transfer machine 14 has held the rigid core mold 2, the core holding unit 10 downwardly moves the connecting part 18 by the first elevating device 19 (S5-3).

If the downward move of the connecting part 18 is confirmed, the transfer machine 14 moves in the left-right direction Y toward the forming machine 15 side, and transfers the rigid core mold 2 to the forming machine 15 (S5-4).

The rigid core mold 2 is transferred from the core holding unit 10 to the transfer machine 14 in the horizontally oriented state. Therefore, the transfer machine 14 tilts the connecting part 17 by the tilting device.

Thereby, the rigid core mold 2 is turned into the vertically oriented state.

Thereafter, the transfer machine 14 transfers the rigid core mold 2 to the forming machine 15.

In this embodiment, as explained above, the tire T can be continuously manufactured.

According to the method for manufacturing the tire T in this embodiment, there are included the step S3 for removing the core 5 from the tire-accompanied assembling type rigid core mold 2 and setting it at the assembly station P3, the removal and assembly step S4 for removing one core segment 3 from the tire T by moving it inwardly in the tire radial direction from the tire-accompanied rigid core mold G from which the core 5 has been removed and mounting it on the core 5, and the removal and assembly step S4 is performed with respect to all of the core segments 3 in the tire T.

Accordingly, a new rigid core mold 2 can be assembled at the assembly station P3, while removing the rigid core mold 2 from the tire T.

Accordingly, the burden on the worker can be greatly alleviated.

while description has been made of particularly preferable embodiments of the present invention, the present invention can be carried out by modifying into various embodiments without being limited to the illustrated embodiments.

DESCRIPTION OF REFERENCE SIGNS 1 apparatus
2 rigid core mold 3 core segment
3a second engaging portion
4 core main portion
5 core
5a first engaging portion
10 core holding unit
11 tire holding unit
12 segment removing unit
13 segment assembling unit
14 transfer machine
18 connecting part
30 annular frame part
31 tread pusher
32 rod
34 pad
37 immovable frame part
39 chuck part
39a coupling device
39b shaft portion
46 clamp part
49 clamp
49b protrusion
G tire-accompanied rigid core mold
T tire
t tread portion
P1 transfer station
P2 disassembly station
P3 assembly station

The invention claimed is:

1. A method for manufacturing a tire comprising:
a first step of forming a green tire on an outside portion of an assembling type rigid core mold at a green tire station, wherein the rigid core mold comprises a core main portion formed in a circular ring having a central hole including the tire revolution axis, by arranging a plurality of core segments in the tire circumferential direction, and a cylindrical core being able to fit in the central hole and able to be removed from the central hole by its axial movement, wherein by being fitted, the core allows each core segment to be fixed in the tire radial direction and the tire circumferential direction, and by being removed, the core allows the core segments to move inwardly in the tire radial direction,
a second step of obtaining a tire-accompanied rigid core mold by vulcanization-molding the green tire together with the rigid core mold,
a third step of removing the core from the tire-accompanied rigid core mold placed at a disassembly station by moving a core holding unit and a core main portion holding section upwardly to move the tire-accompanied rigid core mold upwardly, and then moving a connecting part of the core holding unit downwardly, and removing the core together with a side plate from the tire-accompanied rigid core mold by downward movement of the connecting part, transferring the removed core to an assembly station, and setting the core at the assembly station, and
a fourth core segment removal and assembly step of removing one of the core segments from the tire at the disassembly station by moving it inwardly in the tire radial direction from the tire-accompanied rigid core mold from which the core is removed, transferring the removed core segment to the assembly station, and mounting it on the core being set at the assembly station,
wherein, for each of the core segments in the tire, the fourth core segment removal and assembly step is repeatedly performed, whereby the core segments are assembled into a rigid core mold at the assembly station while removing the core segments of the rigid core mold in the tire placed at the disassembly station,
wherein an outer circumferential surface in the tire radial direction of the core is provided with a first engaging portion and an inner circumferential surface in the tire radial direction of each of the core segments is provided with a second engaging portion for engaging with the first engaging portion, and
wherein the first engaging portion and the second engaging portions are dovetail grooves and dovetail tenons, whereby the core segments are attached to the core one after another by engaging the second engaging portion with the first engaging portion through the repeated fourth core segment removal and assembly step.

2. The tire manufacturing method as set forth in claim 1, wherein the fourth core segment removal and assembly step includes
(a) a step of pressing a tread portion of the tire of the tire-accompanied rigid core mold from the outside in the tire radial direction to hold the tire-accompanied rigid core mold, and
(b) a step of removing said one of the core segments by pushing a part of the tread portion positioned on the outside in the tire radial direction of said one of the core segments to be removed, inwardly in the tire radial direction from the outside in the tire radial direction, so that said one of the core segments is moved inwardly in the tire radial direction and removed.

3. The tire manufacturing method as set forth in claim 2, wherein step (b) includes a step of
rotating the held tire-accompanied rigid core mold around the tire revolution axis, and
removing the core segment from a predetermined same position around the tire revolution axis.

4. The tire manufacturing method as set forth in claim 2, wherein the fourth core segment removal and assembly step includes an assembly step of
rotating the core being set at the assembly station around the tire rotation axis, and
mounting the core segment on the core at a predetermined same position around the tire revolution axis.

5. The tire manufacturing method as set forth in claim 2, wherein the held tire-accompanied rigid core mold and the core being set at the assembly station each lie in a horizontally oriented state in which the tire revolution axis is vertical.

6. The tire manufacturing method as set forth in claim 1, which includes a conveying step of returning the rigid core mold assembled at the assembly station back to the green tire station for forming a green tire so that tires are successively manufactured.

7. The tire manufacturing method as set forth in claim 3, wherein the fourth core segment removal and assembly step includes an assembly step of
rotating the core being set at the assembly station around the tire rotation axis, and
mounting the core segment on the core at a predetermined same position around the tire revolution axis.

8. The tire manufacturing method as set forth in claim 3, wherein the held tire-accompanied rigid core mold and the core being set at the assembly station each lie in a horizontally oriented state in which the tire revolution axis is vertical.

9. The tire manufacturing method as set forth in claim 4, wherein the held tire-accompanied rigid core mold and the core being set at the assembly station each lie in a horizontally oriented state in which the tire revolution axis is vertical.

10. The tire manufacturing method as set forth in claim 2, which includes a conveying step of returning the rigid core mold assembled at the assembly station to the green tire station for forming a green tire so that tires are successively manufactured.

* * * * *